United States Patent

Hodge

[11] Patent Number: 5,760,938
[45] Date of Patent: Jun. 2, 1998

[54] APPARATUS AND METHOD FOR WHEEL ALIGNMENT, SUSPENSION DIAGNOSIS AND CHASSIS MEASUREMENT OF VEHICLES

[76] Inventor: John C. Hodge, 34755 Park East #A101, Solon, Ohio 44139

[21] Appl. No.: 490,818

[22] Filed: Aug. 28, 1995

[51] Int. Cl.$^6$ .................................................. H04J 14/08
[52] U.S. Cl. .................................. 359/139.09; 33/288
[58] Field of Search ........................ 356/139.09; 33/288

[56] References Cited

U.S. PATENT DOCUMENTS

| | | | |
|---|---|---|---|
| 4,265,537 | 5/1981 | Hunter | 356/155 |
| 4,311,386 | 1/1982 | Coetsier | 356/155 |
| 4,330,945 | 5/1982 | Eck | 33/288 |
| 4,466,196 | 8/1984 | Woodruff | 33/288 |
| 4,578,870 | 4/1986 | Cooke | 33/288 |
| 4,863,267 | 9/1989 | Bendickson et al. | 356/155 |
| 4,898,464 | 2/1990 | Thorne | 366/152 |
| 4,918,821 | 4/1990 | Bjork | 33/203.18 |
| 5,018,853 | 5/1991 | Hechel et al. | 356/155 |
| 5,048,954 | 9/1991 | Madley et al. | 356/155 |
| 5,056,233 | 10/1991 | Hechel et al. | 33/288 |
| 5,194,920 | 3/1993 | Mattila | 356/400 |
| 5,274,433 | 12/1993 | Madey et al. | 356/155 |
| 5,505,000 | 4/1996 | Cooke | 33/288 |
| 5,519,488 | 5/1996 | Dale, Jr. et al. | 356/139.09 |
| 5,648,846 | 7/1997 | Douine et al. | 356/139.09 |
| 5,675,515 | 10/1997 | January | 364/559 |

*Primary Examiner*—Mark Hellner
*Attorney, Agent, or Firm*—Howard A. Cohn

[57] ABSTRACT

A device and methods to measure the wheel alignment, to measure the position and orientation of the wheels in relation to the chassis, to measure the chassis and body and to measure parameters of vehicles for problem diagnosis. A beam of colliminated light is directed along a latitudinal reference line. The angle and distance relationship of the wheels to this line are measured. A light beam perpendicular to the latitudinal reference light beam is directed longitudinal to the vehicle. The latitudinal light beam and the longitudinal light beams form a rectangular grid system from which the position of vehicle chassis parts can be measured. A method to calculate and compensate for the errors in the measurement system is used with gravity sensors to more accurately calculate toe, camber and tilt. These angular relations provide toe relative the chassis, camber, caster, s.a.i. and included angle. Also, offset and setback of the front and rear wheels relative to the chassis are provided. A fan of light is used to generate horizontal and vertical datum planes from which additional distance measurements locate vehicle parts. Diagnostic procedures using angular variation, maximum and minimum change of angle, the relation of the change of tilt and the change of toe angles, acceleration and frequency of angular variation of the wheel and frequency of sound during bouncing in addition to the chassis measurements detect and measure vehicle problems.

43 Claims, 11 Drawing Sheets

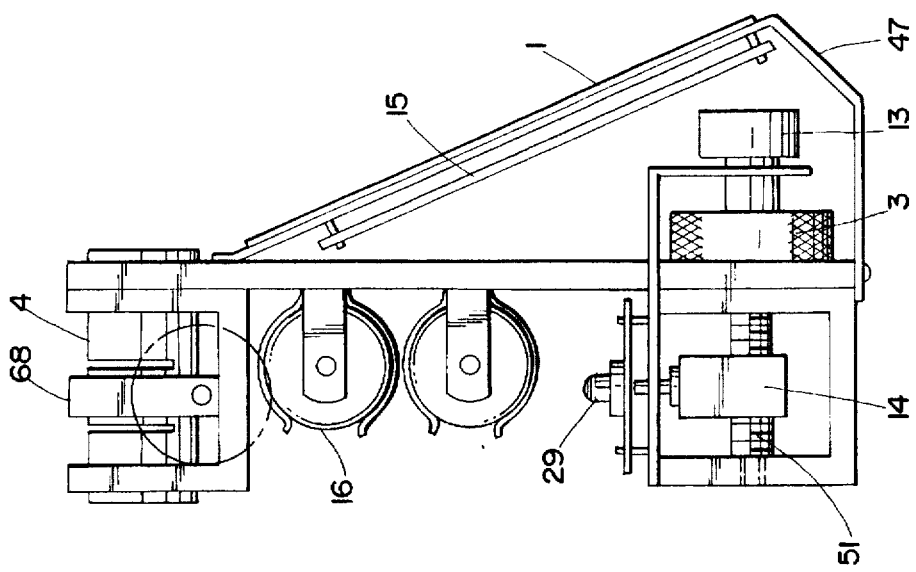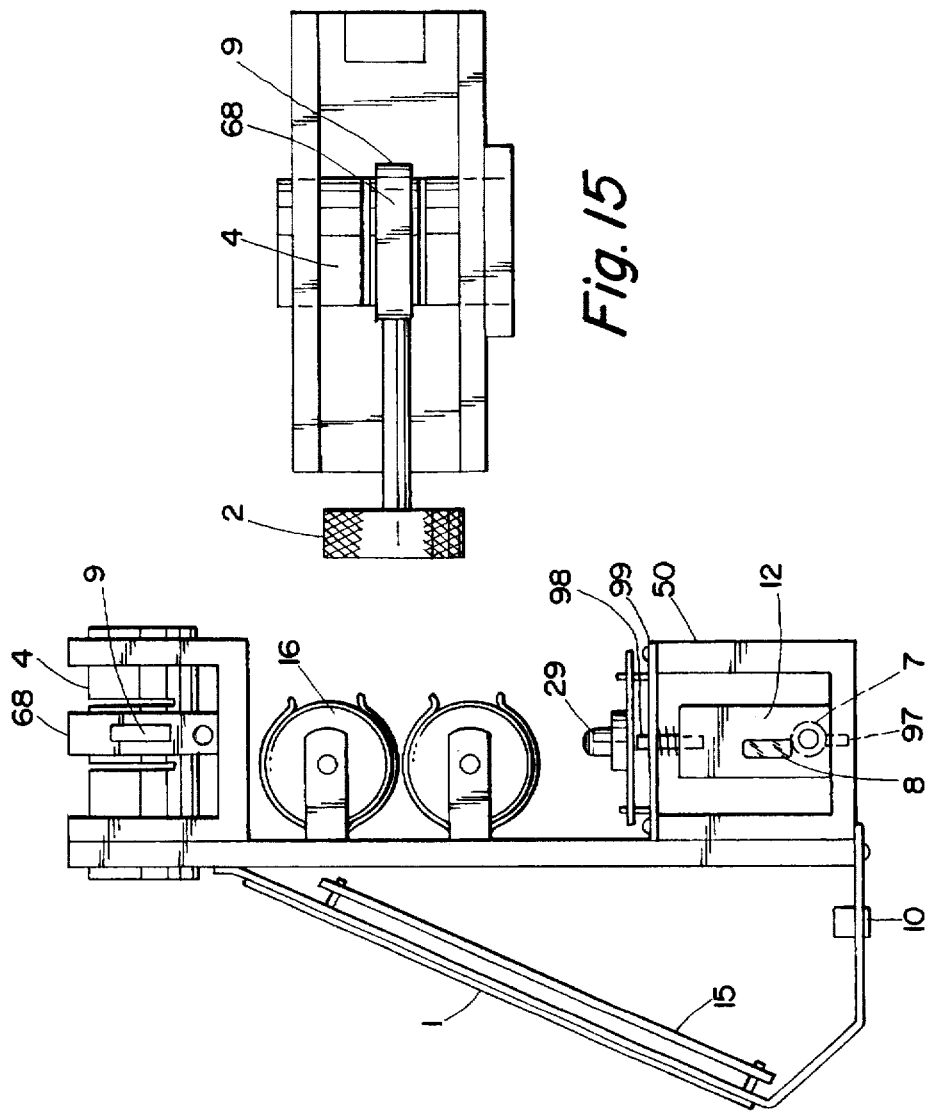

APPARATUS AND METHOD FOR WHEEL ALIGNMENT, SUSPENSION DIAGNOSIS AND CHASSIS MEASUREMENT OF VEHICLES

BACKGROUND OF THE INVENTION

The invention relates to wheel alignment systems, suspension analysis systems and measuring systems for vehicles and, more particularly, to a system employing a light beam, a microprocessor and an electronic angle sensor.

Prior wheel alignment systems for vehicles have suffered from a variety of drawbacks which have limited their effectiveness. Early wheel alignment systems employed mechanical components such as calibers and bubble gauges to measure and adjust steering geometry parameters such as toe-in and toe-out. Mechanical techniques such as these were very cumbersome, difficult to use, and very time-consuming. Among other deficiencies, these techniques could not provide a continuous readout of steering geometry parameters. Measurements had to be made with the wheels in one position and separate measurements had to be made with the wheels in other positions. In addition, the difficulty in using these devices often required that a special section of a garage be dedicated exclusively for alignment purposes and other areas dedicated for vehicle measuring purposes. Special racks sometimes would be installed permanently for each purpose, and these racks could be used for no other purposes than doing vehicle alignment or measurement work.

In an attempt to alleviate difficulties associated with mechanical alignment systems, various wheel-mounted optical systems have been developed. Generally speaking, these optical systems project a beam of light to a sensor mounted on one or both front wheels of a vehicle. Unfortunately, these optical systems have been difficult to set-up, and have been unduly complex and expensive. Moreover, prior optical systems have aligned to the front wheels of the vehicle by reference to each other, rather than by reference to the chassis of the vehicle. Accordingly, these systems have provided only relative alignment measurements, rather than absolute alignment measurements. In turn, these systems have been unable to take into account mechanical misalignments due to chassis damage, bent parts, and the like. Moreover, they have not been able to take into account the effects of sloping or otherwise irregular floors. Accordingly, these systems still require that a special section of a garage be set aside exclusively for vehicle alignment purposes, and special racks still must be used as part of the alignment process.

A particular type of optical alignment system that has had some promise employs a laser beam, rather than a conventional light beam. Unfortunately, the proposed laser beam system has not been entirely successful, in part because a sensor unit employing a photocell has been used. The light beam impinging on the photocell causes changes in electrical output of the photocell. Depending upon the amount of light striking different portions of the photocell, these changes in electrical output can be correlated to orientation of the wheel relative to the light beam; in turn, readings of steering geometry can be obtained. The most important drawback of this system is that attenuation of the light beam for any reason influences the output of the photocell and, thus, steering geometry readouts being obtained. For example, airborne dust will cause inaccurate readings, thus rendering this proposed system unacceptable under many circumstances.

Another particular type of light beam alignment system that has had some promise employs a measurement from the centerline of the vehicle to establish a chassis reference. Unfortunately, this implementation has not been entirely successful, in part because of the difficulty in accurately finding centerline. Another drawback of this system is that it does not detect if the centerline is bent between the measurement points. For example, if the vehicle suffered a side collision, the chassis may be bent in banana shape. Thus, any bend will cause inaccurate readings.

Another limitation of prior alignment systems is they do not characterize the orientation of the rear axle. Therefore, if the rear axle is not properly positioned relative to the chassis, a poor alignment results.

Many alignment systems use electronic components to measure angles. These components are subject to drift in the measurements over time. Although accurate relative to mechanical systems, the electronic measuring systems' accuracy can be improved.

Prior measuring systems for vehicles have been large and require a mechanical fixture to hold the vehicle. The vehicle must be held to establish a horizontal that is true to gravity. The system cannot compensate for unlevel conditions. This requires a dedicated area of the shop and a permanent fixtures.

Early measuring systems employ mechanical components to hold the vehicle, to provide right angles, to hold the measuring fixture vertical or parallel to level and to attach to the vehicle measuring points. These mechanical techniques are cumbersome, are difficult to use, are very time consuming and require a large number of separate parts.

In an attempt to alleviate difficulties associated with mechanical measuring systems, various other techniques have been developed such as optical systems, sonic systems and other ranging techniques. The optical systems suffer from the same disadvantages as mentioned above.

A particular type of optical alignment system that has had some promise employs a laser beam. The laser beam projects onto the point to be measured. Unfortunately, this system requires the use of a fixture to hold the vehicle, to provide level and to provide the measurement. Additionally, the right angle is provided mechanically with the inaccuracy this implies.

Another type of measuring system employs a ranging technique such as sonic signals. This system requires the use on a fixture and sensors which suffer from the same problems and atmospheric limitations.

Because all the measuring systems require a fixture, an operator cannot be under the vehicle to measure difficult to reach places.

Prior suspension analysis techniques for vehicles have been to test drive the vehicle and to watch the vehicle while it is bounced and jounced. The test drive can detect if a major problem exists, but requires a highly skilled operator. Also, the vehicle cannot be examined in the shop. Watching the bounce and jounce depends on the skill of the operator and can detect only the more extreme problems. This has led many repairs to be done by trial and error with the inefficiency this implies.

It has long been recognized that the change in angle of the tire during bounce and jounce is an indicator of the dynamic performance of the suspension. However, no system has been built.

It has long been recognized that the changing position of various joints under the vehicle when the vehicle is pulled down or pushed up is an indicator of proper tune of a suspension. The various measuring systems require a fixture under the vehicle. Thus, they cannot measure adequately for suspension analysis.

In view of the difficulties associated with prior wheel alignment systems, measuring systems and suspension analysis systems, there remains a need for an optical alignment system employing the favorable features of a light beam, without the drawbacks of prior proposals such as undue complexity, expense, lengthy set-up times and the like. Additionally, it is desirable to have a vehicle alignment system that will provide more accurate and absolute readings of steering geometry, rather than relative readings, relative to the chassis but without reference to a possible bent centerline. It is desirable to have a measuring system that can be set back from the vehicle to allow operators under the vehicle and to have a measuring system that can sense an angle to gravity so measurements depend less on mechanical fixtures. It is desirable to have a suspension analysis system in the shop on which more sensitive, dynamic measurements can be taken. Furthermore, it is desirable to have a wheel alignment system, measuring system and suspension analysis system that can be used in a great variety of places, which will not require the use of special racks or sections of a garage and which may be transported.

Also, it is desirable to have one system which will serve many purposes.

SUMMARY OF THE INVENTION

The present invention overcomes the foregoing and other difficulties of prior proposals by providing a new and improved alignment system for vehicles capable of measuring toe relative the chassis, camber, caster, steering axis inclination and included angle. The system also provides a means to measure diagnostic parameters and to measure the location of vehicle body parts relative to reference lines of the manufacturer.

According to the broad aspect of this invention, a single, highly colliminated beam of light provides a straight line, a prism reflects the light beam 90 degrees providing a square reference and electronic angle sensors provides a plumb reference. In addition, a fan generator provides a plane of light which can be made horizontal or vertical to the vehicle. Thus, a level surface is not needed. Calculations and control are performed by a microprocessor which converts electronic signals from the sensors into meaningful information, calculates and corrects for error and calculates diagnostic parameters.

This invention uses a head within which a light beam unit, an electronic gravity sensor unit, a power unit, a display unit, a sonic sensor unit, a signal processor unit, an acceleration sensor, a means to communicate with an external computer or remote display module, a means to communicate with a remote sensor module and a microprocessor calculating and control unit are disposed. The head is used with prisms to direct the light beam in the desired direction, rulers for linear measurement and supports for the rulers and prisms. The head can be used with an external computer for greater display capability. The head is compact, relatively inexpensive, portable, and can be set up for alignment, suspension analysis and measurement purposes in a minimal amount of time.

The head is secured to the vehicle's wheels by means of a rim adaptor. The head is connected to the shaft of the rim adaptor by means of an adjustable clamp which permits the head to be moved toward or away from the wheel, to be pivoted about the shaft of the rim adaptor and to be maintained in a selected angular position.

The gravity sensor unit includes an electronic element which senses the head orientation relative to gravity in 2 directions and the electronic circuit necessary to provide signals to the control unit indicating orientation. The sensor is fixedly attached to the head. By appropriate calibration during manufacture of the electrical output of the sensor, the position of the sensor head relative to the horizon can be determined quickly and accurately in use. In turn, caster, steering axis inclination and camber readings for the vehicle's wheels can be determined.

Since the gravity sensor can continually send signals to the control unit, the movement of the vehicle's wheel can be monitored continually during movement such as bouncing. The resulting data can be used to analyze the suspension of a vehicle.

The head includes an acceleration sensor. When analyzed by the microprocessor, position, velocity and acceleration can be determined for each wheel several times per second. When the vehicle is moving, this data can show how the wheel moves as the vehicle moves. This can help analyze situations in which problems occur only when the vehicle is moving.

The head includes a sonic sensor which transmits electrical signals to the signal processing unit. The sonic sensor is attached to the part of the head which is directly connected to the shaft of the rim adaptor. Thus, there is a metal connection to the vehicle. The signal processor unit determines the frequencies and amplitude of the sonic vibrations detected when the vehicle is moved. An analysis of these can determine some types of damage.

The head includes a light beam holding fixture which is attached to a position monitoring element. As the light beam is moved, the position monitoring element provides an electronic analog of the orientation of the light beam.

The control unit includes appropriate circuitry and a microprocessor to convert the readings from the sensor units and from the light beam unit to meaningful information, to calculate and to provide signals to a numerical display.

The power unit includes electrical components necessary to convert incoming voltage to the electrical power needed by the other electrical units and to charge batteries. The power unit includes a battery unit to provide power so the head can be portable.

When used with right angle prisms, the head can provide a beam of light perpendicular to the latitudinal reference line of the vehicle. By using magnetic gauges which hang from critical points such as torque box holes, a chassis reference can be formed. Since this method will not require a reference to the centerline and does use physically identifiable parts of the vehicle, this method will provide a more accurate alignment to the chassis. Distance measurements are taken from the latitudinal light beam through the reference points and longitudinally from the light beam from the head on the wheel. Therefore, this method results in the distance measurements being performed in a manner similar to the method found in vehicle specifications even when the centerline is bent.

Since each head is independent and does not require other heads for reference, compensation for rear axle offset and setback can be easily accomplished.

Other methods according to the invention uses the head to measure many diagnostic parameters such as the relationship of toe angle change and tilt angle change. minimum and maximum movement during bouncing, frequency of wheel movement and frequency of detected sound. Also, error calculation methods calculates the error of electronic drift, the mechanical error experienced during the error measurement and the mechanical error.

By using the alignment system according to the invention, set-up time is reduced markedly compared with prior mechanical or optical alignment systems. Because measurements are made to a chassis reference, the effects of an uneven floor can be compensated for during initial set-up, thereby eliminating the need for any special racks or sections of a garage to be used for alignment purposes. Compared with prior alignment systems, the alignment system according to the invention is accurate, mechanically and electrically straight-forward, inexpensive, and reliable.

Further properties and advantages and a more complete understanding of the invention, will become apparent by referring to the following description and claims, taken in conjunction with accompanying drawings.

DESCRIPTION OF THE DRAWINGS

FIG. 14 is a laser side view of the head in FIG. 6 with the housing removed.

FIG. 15 is partial top plan view of the head of FIG. 5 with the cover removed.

FIG. 16 is a break side view of the head in FIG. 7 with the housing removed.

DETAILED DESCRIPTION OF THE INVENTION

Figure 8:
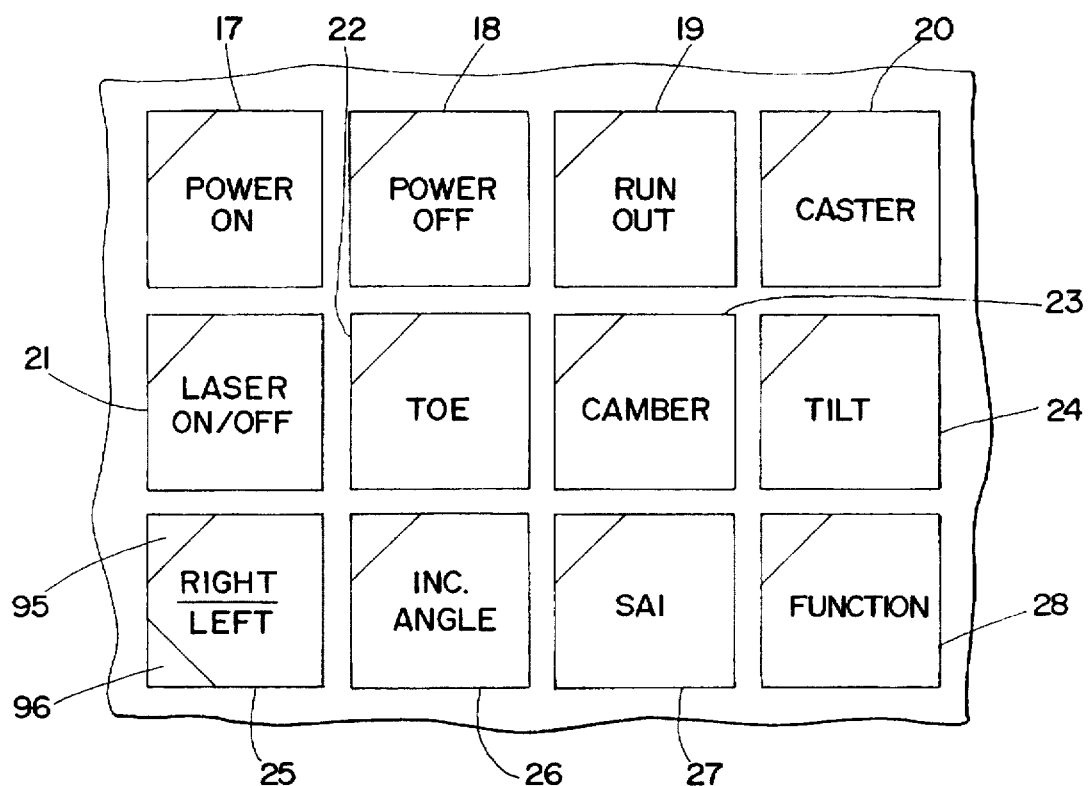
FIG. 8 is a fragmentary view of the keypad on the measuring head of FIG. 5.
Figures 9, 10:
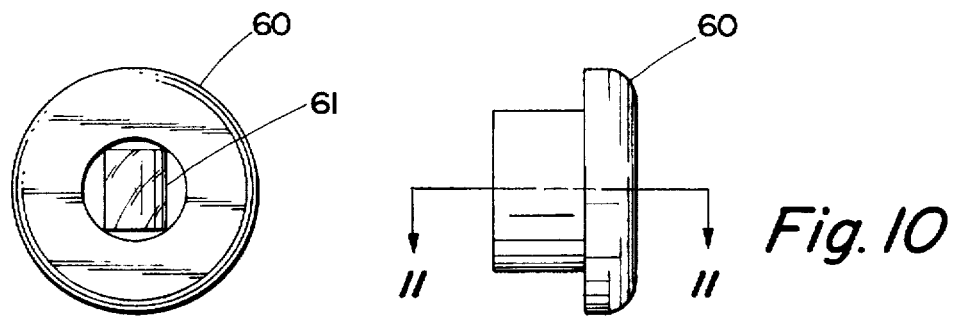
FIG. 9 is a front view of the fan generator.
FIG. 10 is a side view of the fan generator.
Figure 11:
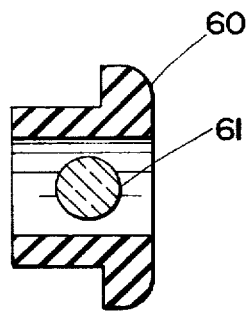
FIG. 11 is a sectional view of a fan generator, the view being taken along line 11—11 in FIG. 10.
Figure 17:
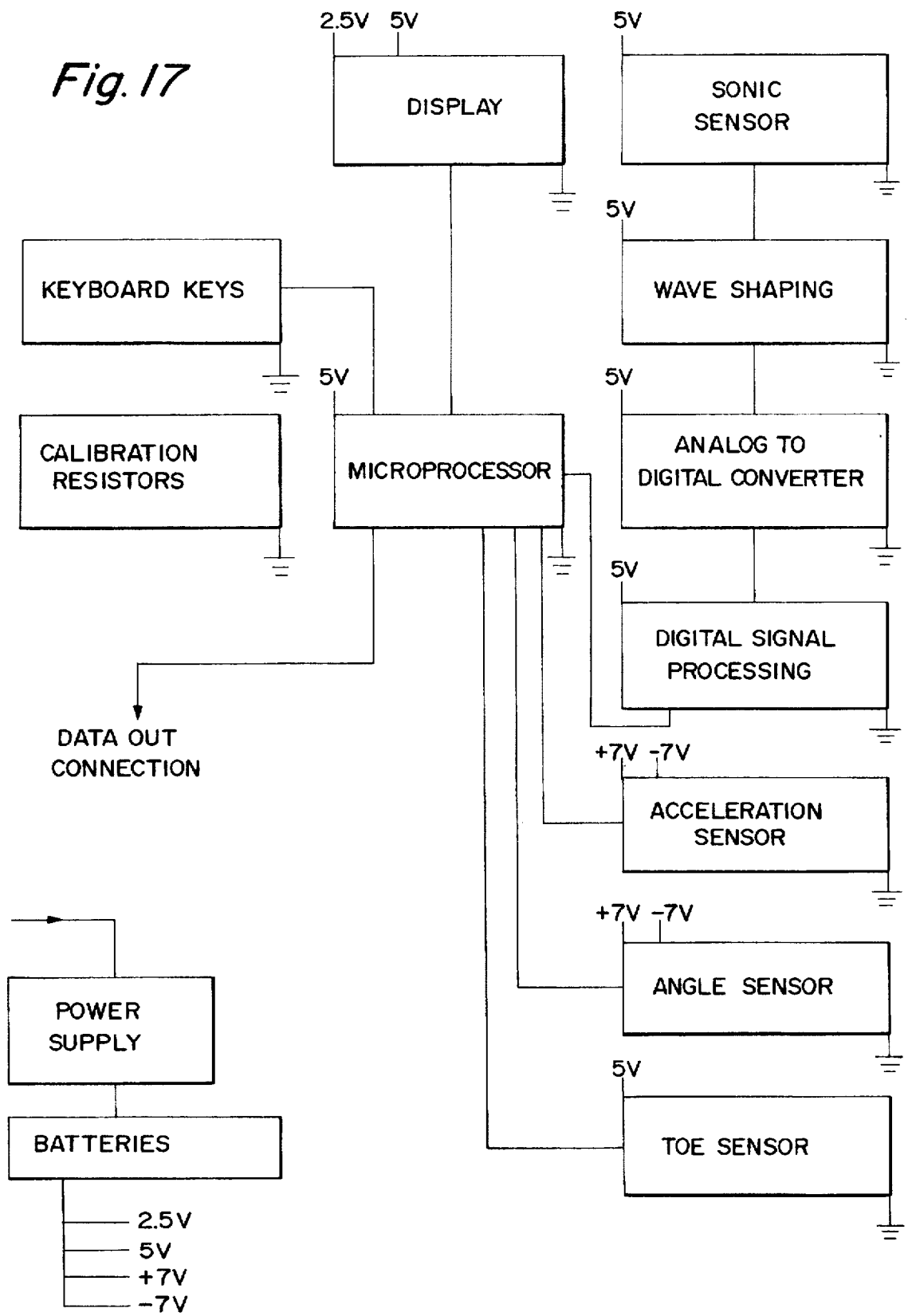
FIG. 17 is a general simplified block diagram of the circuit arrangement in the present apparatus.
Figure 18:
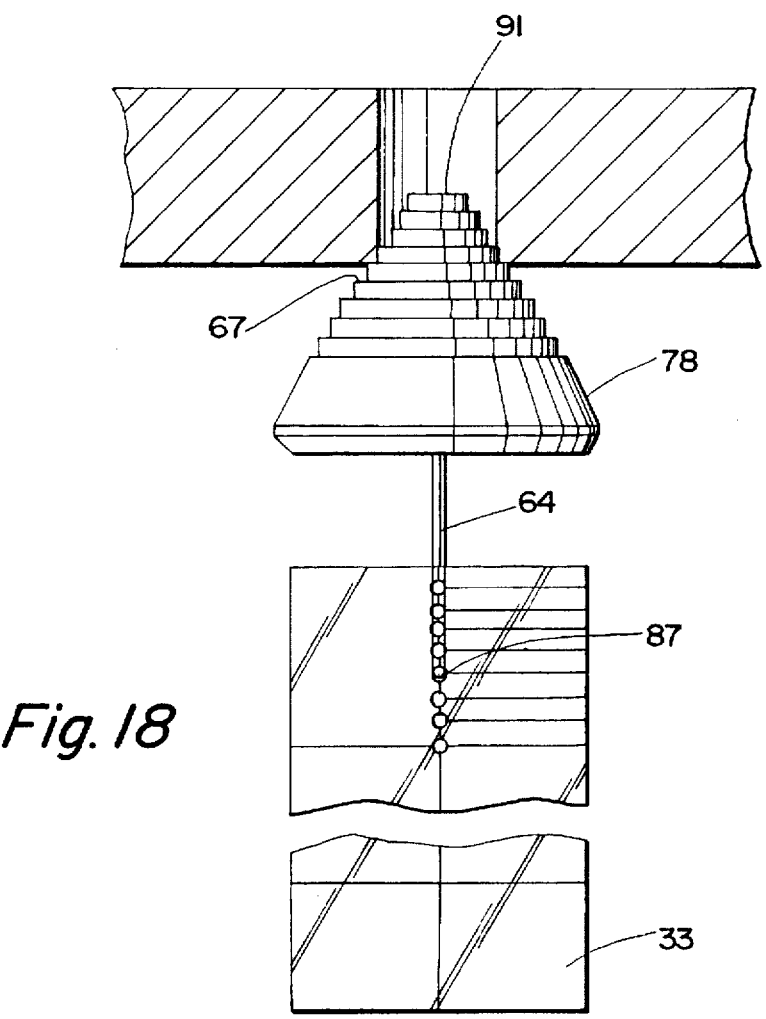
FIG. 18 is a fragmentary view of the gauge apparatus as positioned in a hole.
Figures 19, 20:
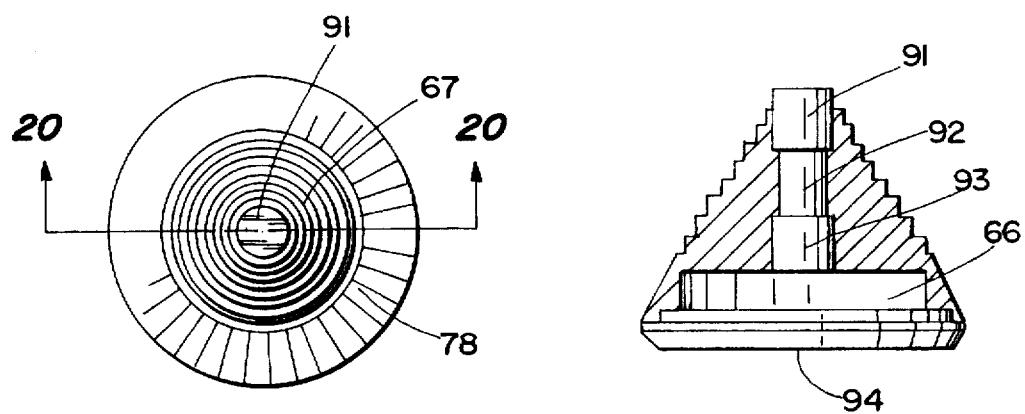
FIG. 19 is a top view of the magnetic cone of the gauge apparatus of FIG. 18.
FIG. 20 is a sectional view of a magnetic cone, the view being taken along line 20—20 in FIG. 19.
Figures 21, 22, 23:
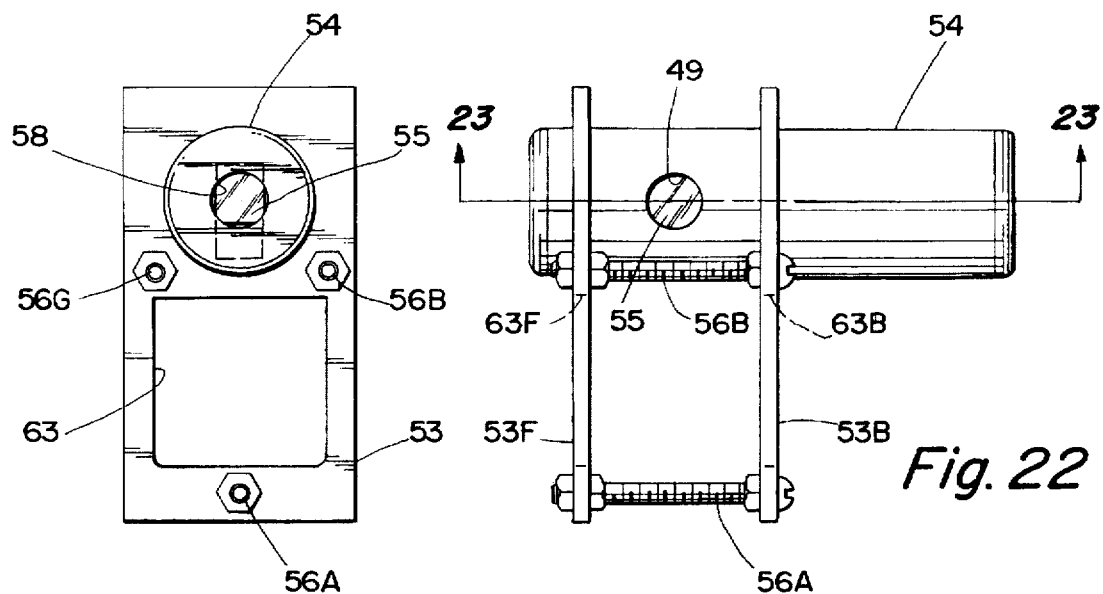
FIG. 21 is a front view of the prism holder.
FIG. 22 is a side view of the prism holder.
FIG. 23 is a sectional view of the prism holder, the view being taken along line 23—23 in FIG. 22.
Figure 28:
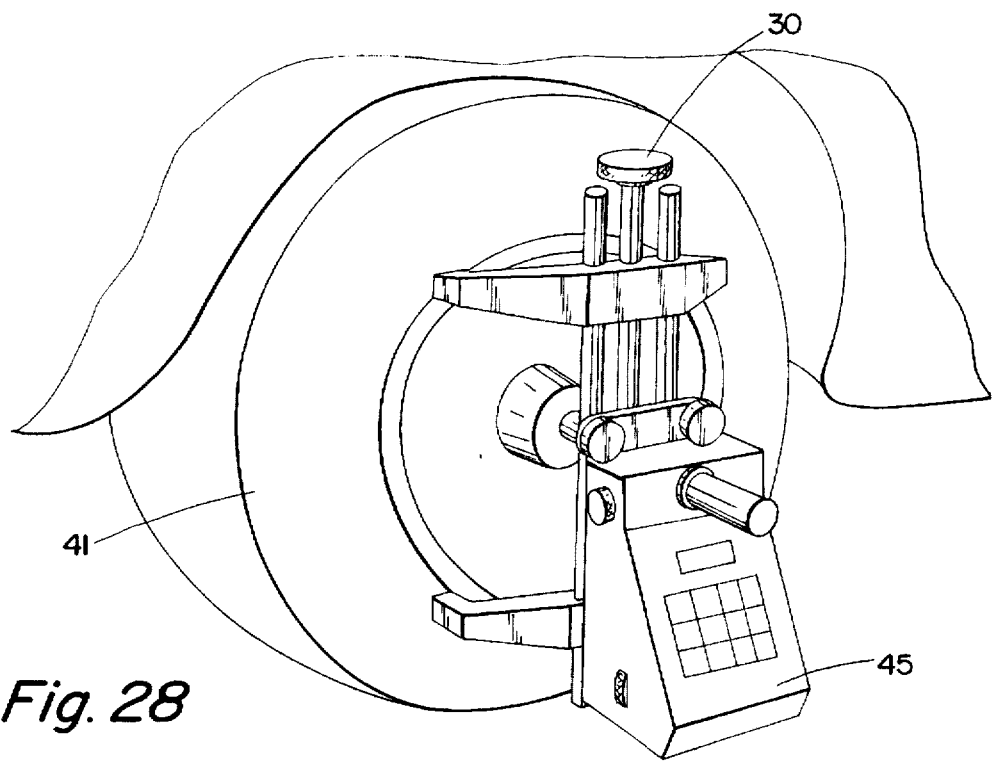
FIG. 28 is a perspective view of the attachment of the rim adaptor and head to a wheel with the rim adaptor in the 12 o'clock position and the head facing away from the wheel.

The instrumentation for the present apparatus includes a measuring head 45 shown in FIGS. 5, 6, 7, 8, 12, 13, 14, 15, 16 and 17; a magnetic gauge assembly 89 shown is FIGS. 18, 19 and 20; a prism assembly 32 shown in FIGS. 21, 22 and 23 and a fan generator 62 shown in FIGS. 9, 10 and 11. The head 45 is carried on a rim adaptor 30 and attached to the wheel 41 as shown in FIG. 28. The head 45 projects light beams longitudinally along the vehicle toward the head on the same side on the vehicle, measures the direction of the light beam relative to the orientation of the head 45, measures the vertical orientation of the head 45 relative to gravity and displays the result of calculations on the display 38.

For convenience, certain conventions are adopted herein. The designations "RF", "LF", "RR", and "LR" refer to the wheel of the vehicle right front, left front, right rear and left rear, respectively. These designations are used after a numerical identifier to further identify the location. For instance, 45RF refers to a head 45 used and attached to the right front wheel 41RF.

Figure 12:
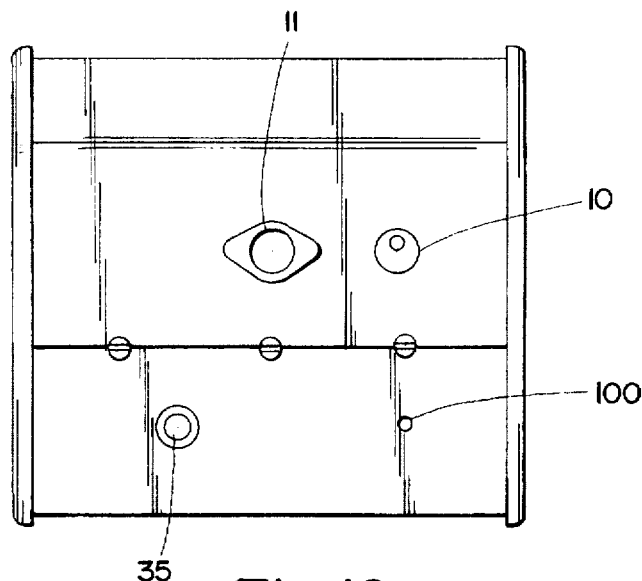
FIG. 12 is the bottom view of the measuring head of FIG. 5.

FIGS. 5, 6, 7, 8, 12, 13, 14, 15, 17 and 17 shows the typical head assembled in a suitable housing which is made up of a frame 50 in FIG. 14 to which is attached a front/bottom cover 47, a break side cover 46, a light side cover 48, a back/top sheet metal cover (not shown). The frame 50 also holds the angle sensor 29, batteries 16, light projector block 12, light angle adjustment block 14 and screw 51, and shaft attachment block 4. FIG. 12 shows the frame 50 also has a tripod attachment hole 35 as a means for attachment to a tripod (not shown) and for attachment of the measuring rail (not shown).

The angle sensor 29 is fixedly attached to the frame 50 and provides an electrical signal which is an analog of the angle of the head 45 to level in a side to side rotation and in a front to back rotation.

Figure 13:
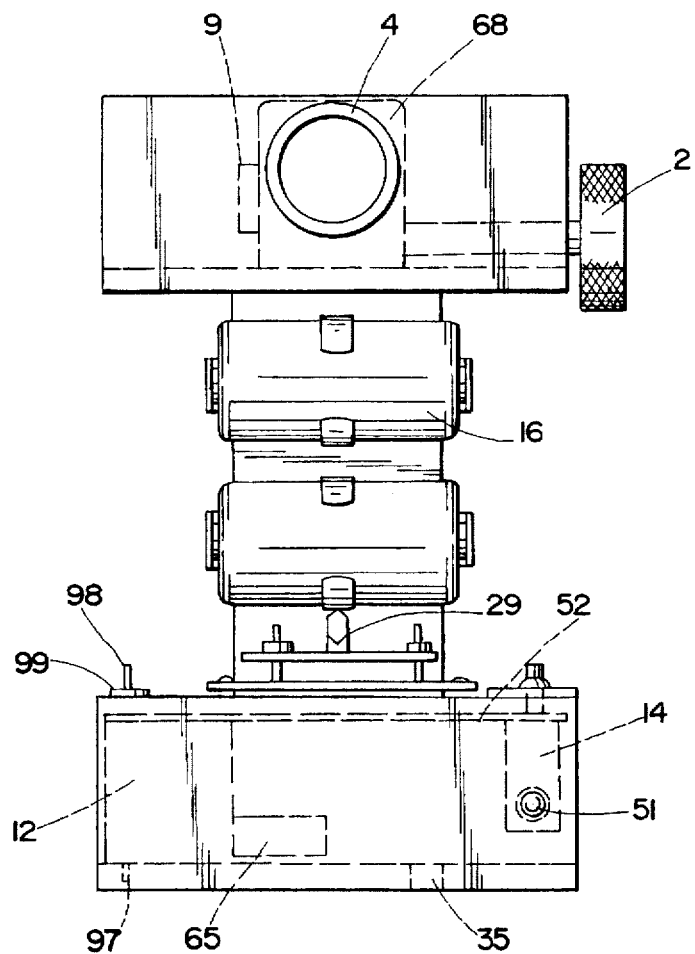
FIG. 13 is a back view of the head in FIG. 5 with the housing removed.

The toe adjustment knob 3, rotates a screw 51 which moves the block 14 by screw action. The block 14 moves the light projector block 12 by being connected via the projector arm 52 as shown in FIG. 13. The block pivots about an axis defined by the upper pivot 98 which is held by the pivot bar 99 which is attached to the frame 50 and the lower pivot 97 which is held in the hole for the pivot 100 in the frame 50. As shown is FIGS. 13 and 14, the rotation of the toe adjustment knob 3 effects sweeps of the light projector block 12 through an angle of at least 2 degrees and rotates the shaft of the potentiometer 13. Therefore, the resistance of the potentiometer 13 is the analog to direction and amount of rotation of the light projector block 12.

The light projector block 12 is equipped with a light sensor 8. As light impinges on the light sensor 8, the light sensor 8 produces an electrical signal which is the analog of the intensity of the impinging light.

As shown in FIG. 15, the shaft attachment block 4 has attached a sonic sensor 9 and a break knob 2. By rotation of the break knob 2, the shaft attachment block 4 tightens about the shaft of the rim adaptor 30 as seen in FIG. 28 such that the head 45 is held and will not move relative to the rim adaptor 30.

The sonic sensor 9 produces an electrical signal as sound is transmitted by the mechanical attachment from the frame of the vehicle (not shown), to the rim adaptor 30 and to the shaft attachment block 4. The frequency and amplitude of the electrical signal is the analog of the frequency and amplitude of the detected sound.

The light side cover 48 has attached the buzzer 5 and led indicator 6 and a suitable light exit hole 7 for the exiting light beam. The break side panel has suitable holes for the break knob 2 and toe adjustment knob 3. The front/bottom cover 47 has attached the keypad 1, the display 38, the power plug 10, the data port connector 11 and the circuit board 15. The circuit board 15 is connected by suitable connections (not necessary to show) which carry electrical signals to the display 38, the buzzer 5, the led indicator 6, the light projector block 12 and the data port connector 11; and from the light sensor 8, the potentiometer 13, the keypad 1, the power plug 10, and the angle sensor 29.

The light from the light projector block 12 can be any colliminated beam of light in the visible spectrum. In this embodiment a diode laser is used with a 633 nanometer wavelength and less than 5 milliwatts of power. The power requirement falls within the limits for safe operation prescribed by OSHA.

Workers skilled in the art will recognize that the head may be constructed so that the light beam can be directed out the left side of the head. A head so constructed is numbered 44.

Electronic Apparatus

FIG. 17 illustrates the general circuit arrangement for translating the electrical signals from the sensors 8, 9, 13, and 29; from the data port connector 11 and from the keypad 1 into electrical signals that are sent to the display 38, the led indicator 6, the buzzer 5, and the data port connector 11.

The respective signals developed in the circuit board 15 can be directed to the display circuitry, to the data out connection of the data port connector 11 to another computer (not shown) for more processing and display; to a remote display unit (not shown) or to a memory unit (not shown). The type of data that can be directed out the data port connector 11 is the number appearing on the display 38, any of the numbers developed by the microprocessor or any of the signals from the sensors 8, 9, 13, and 29. Also, the data port connector 11 can be used to accept data from other sensors, from other heads and from computers.

The sonic sensor circuit includes the sonic sensor 9 and the wiring (not necessary to show) to direct the signals to the wave shaping circuit. The wave shaping circuit modifies the amplitude of the electrical signal from the sonic sensor circuit to be suitable for signal processing. The analog to digital converter changes the varying analog signal from the wave shaping circuit to a series of high voltage and low voltages which represent digital numbers which represent the amplitude of the analog signal at a moment in time. The digital signal processing circuit calculates the required characteristics of the sonic signal such as frequency and relative amplitude using the numbers from the analog to digital converter. The digital signal processing circuit sends the results of the calculations to the microprocessor.

The acceleration sensor consists of the angle sensor 29 and the wiring (not necessary to show) to that part of the circuit board 15 providing an electronic buffer to the microprocessor and a circuit to determine the change (velocity) of the change (acceleration) of the electrical signal from the angle sensor 29. The electrical signal from the acceleration sensor is an electrical signal which is the analog of the acceleration experienced by the angle sensor 29. An alternative implementation may represent the acceleration experienced by the angle sensor 29 as a number developed in the microprocessor calculation.

The angle sensor includes the angle sensor 29 and the wiring (not necessary to show) to that part of the circuit board 15 providing an electronic buffer to the microprocessor. The electrical signal from the angle sensor is an electrical signal which is the analog of the angle of orientation of the angle sensor 29.

The toe sensor includes the potentiometer 13 and the wiring (not necessary to show) to that part of the circuit board 15 providing an electronic buffer to the microprocessor. The toe sensor provides an electrical signal to the microprocessor which is the analog of the position of the light beam.

The keyboard keys are switches in the keypad 1. FIG. 8 shows the layout of the keys. By pressing a key, the switch is closed contact is made, an electrical path is created to ground. Which electrical path is thus shorted to ground is used by the microprocessor to indicate the operator's choice of program routine to execute.

The calibration resistors are resistors which are selected during manufacturing. When used in conjunction with the electrical signals from the sensor circuits, the numbers calculated by the microprocessor represent standard units of measure such as degrees.

The power supply and batteries are circuits consisting of the power plug 10, wiring (not necessary to show), the batteries 16 and the necessary parts of the circuit board 15 to provide the required voltages of 2.5 volts, 5 volts, 7 volts and –7 volts. The voltages so developed are routed by wires (not necessary to show) to the parts of the circuit board 15 where required.

The microprocessor is connected by wires (not necessary to show) to the other parts of the circuit board 15. The microprocessor executes a program which converts the various electrical signals into electrical signals which, when displayed, represent meaningful information to the operator.

Fan Generator

Figure 24:
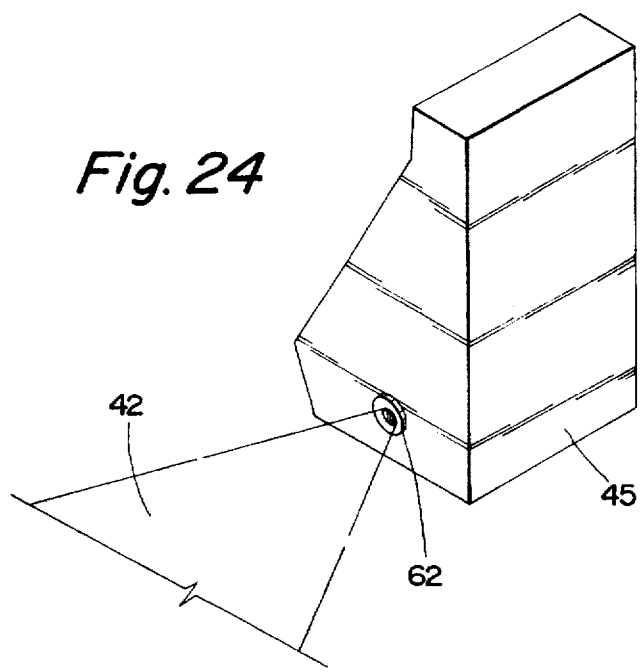
FIG. 24 is a perspective view of a head with the fan generator.

FIGS. 9, 10 and 11 show the fan generator 62. A cylindrical glass rod 61 is held in the center of the grommet 60. FIG. 24 shows the fan generator 62 inserted into the light exit hole 7 of a head 45. The light passes through the glass rod 61. The cylindrical glass rod 61 deflects the light into a fan of light. The shape of the grommet 60 allows the fan generator 62 to turn in the light exit hole 7. Therefore, the fan of light 42 may be turned to any orientation. The fan of light 42 accurately defines a line of light on a surface when it impinges on a surface.

Magnetic Gauge Assembly

FIG. 18 shows the transparent gauge 33 held by the gauge hook 64 which is held magnetically to the magnetic gauge assembly 34. This assembly is defined as the magnetic gauge assembly 89. The magnetic gauge assembly 34 is held to the vehicle magnetically. The magnetic gauge assembly 34 marks the location of desired vehicle parts.

FIGS. 19 and 20 shows the construction of the magnetic gauge assembly 34. The shape of the cone 78 is such that it will fit into holes commonly found on vehicles. The ledges are such that they will rest on the edge of holes commonly found on vehicles. The depth the magnetic gauge assembly 34 will go into the hole is determined by which ledge 67 rests on the vehicle hole. The magnetic gauge assembly 34 is held in place by a combination of small magnets 91, 92 and 93 on top of large magnet 66. They are arranged such the magnetic fields hold the assembly together. To further hold the assembly of magnets 91, 92 93, 66 and cone 78 together, a potting compound fills the volume inside the cone 78 and a cap 94 is placed over the large end of the cone 78. If the magnetic gauge assembly 34 did not have the small magnets 91, 92 and 93, the magnetic gauge assembly 34 would twist in the hole and rest on the side rather than on one of the ledges 67. The attachment of the transparent gauge 33 as illustrated in FIG. 18 allows the light beam from a head 45 to locate the vehicle part.

Placing the Gauges

FIG. 18 shows the placement and use of the magnetic gauge assembly 34, the gauge hook 64, and the transparent gauge 33. The magnetic gauge assembly 34 can be placed on a bolt head by placing the point of the cone 78 on the bolt head. FIG. 18 shows the placement of the magnetic gauge assembly 34 in a hole on a vehicle chassis. The size of the hole will determine which ledge 67 the cone 78 will rest. If the magnetic gauge assembly 34 rests on a bolt head, the gauge hook 64 is placed in the bottom hole of the transparent gauge 33. If the magnetic gauge assembly 34 rests on the first ledge 67, the gauge hook 64 is placed in the second from the bottom hole of the transparent gauge 33. Similarly, the gauge hook 64 is placed in the gauge hole 87 of the transparent gauge 33 corresponding to the ledge on which the magnetic gauge assembly 34 rests.

Prism Assembly

FIGS. 21, 22 and 23 shows the prism assembly 32. The prism 55 is held in a tube 54 which is held in a prism holder front frame 53F and prism holder back frame 53B in such a way that the tube 54 can rotate about its long axis. The prism holder front frame 53F and prism holder back frame 53B are held by means of bolts 56A, 56B and 56C. Light that enters through a end hole 58 at one end of the tube 54 exits after being reflected 90 degrees plus or minus 3 minutes of arc by the prism 55 through side hole 59 on the side of the tube 54. Rotation of the tube 54 about an axis of the incoming light will allow the reflected beam to be directed anywhere in the plane perpendicular to the incoming light. The prism holder frame 53F and 53B has a rail attachment hole 63 such that a support rail (not shown) will pass through.

Workers skilled in the art will recognize that the other means to achieve a constant deviation of rays transmitted by the useful aperture of 90 degrees regardless of the optical axis of the incident light beam may be used. For example, two mirrors may be arranged to produce the effect of the pentaprism. Also, prisms are available which provide greater accuracy. Also, other prisms or mirror arrangements that produce a constant deviation of rays, e.g. 60 degrees, may be used when the procedure is changed to accept other deviation angles.

Operation

For ease and clarity of explanation, braces are used to identify a number which is measured, appears in the display 38, is used in calculation or is the result of a calculation. The name of the number appears inside the braces. For instance, (toe.RF.ch) refers to a number which represents the toe [major noun] of the right front [RF—an adjective] and is referenced to chassis alignment method [ch—a further adjective].

Runout Correction Factors

Mechanical errors in the wheel or attachment of the rim adaptor to the wheel, or drift in the electronic circuitry will cause error in the measurement of the angles tilt, camber and toe. The effect of these errors can be calculated and compensated for using correction factors.

The angle of rotation of the head 44 or 45 side to side is called the "(x)". The (x) angle is 0 degrees if the head 44 or 45 is upright. The (x) angle will be positive if head 44 or 45 is rotated such that the light beam is directed above horizontal and negative if light beam from the head 44 or 45 is directed below horizontal.

The angle of rotation of the head 44 or 45 from a vertical plane forward or backward is called the "(y)" angle. If the head 44 or 45 is upright to vertical, the (y) angle measurement will be 0 degrees. The (x) and the (y) angles are orthogonal. The (y) angle will be positive if head 44 or 45 is rotated such that the front of the head 44 or 45 faces downward. The (y) angle will be negative if the head 44 or 45 is rotated such that the front of the head 44 or 45 faces upward.

Both the (x) and (y) angles will be limited to vary between −90 and 90 degrees.

The potentiometer 13, the light projector block 12 and the circuit board 15 calculations are assembled in such a way that the angle of rotation of the light beam in a horizontal plane [(y)=0 degrees] to the head 44 or 45 is called the (z) angle. The (z) measurement will be 0 degrees if the light beam is perpendicular to the axis of the shaft attachment block 4. The (z) angle will be positive if the light beam is rotated clockwise from 0 degrees when view from above. The (z) angle will be negative if the light beam is rotated counterclockwise from 0 degrees when view from above.

FIGS. 25 through 29 shows the RUNOUT process. The RUNOUT process calculates the error in the (y) angle measurement [herein (error.y)] and (z) angle measurement [herein (error.z)] due to mechanical setup errors and the error associated with the electronic circuitry and angle sensor 29 [herein (error.sensor)].

Figure 27:
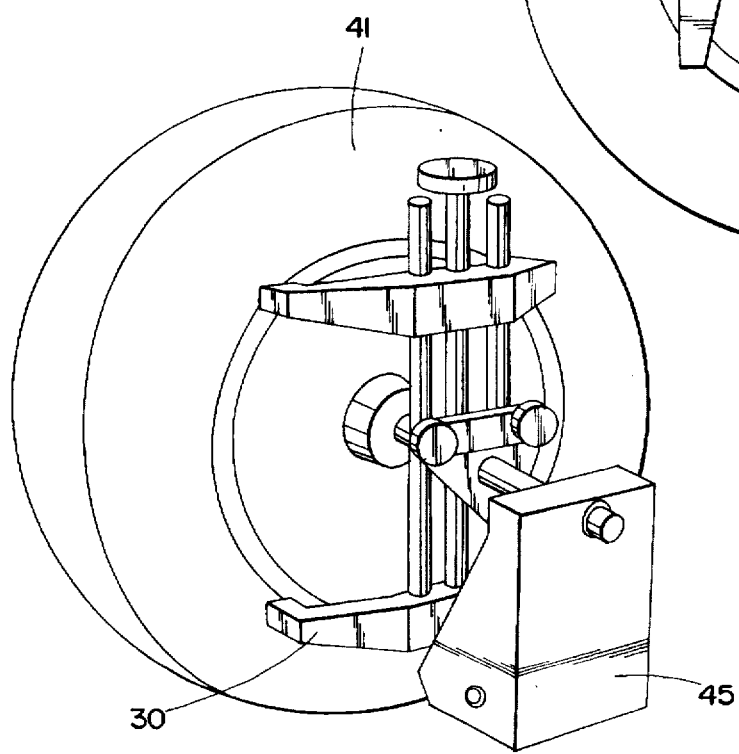
FIG. 27 is a perspective view of the attachment of the rim adaptor and head to a wheel with the rim adaptor in the 12 o'clock position and the head facing the wheel.

After turning on the power by pressing the power on key 17, the operator attaches the rim adaptor 30 and head 45 to the wheel 41 to be measured as seen in FIG. 27 with the keypad 1 facing the wheel 41 and the rim adaptor 30 at the 0 degree or 12 o'clock position. Pressing the runout key 19 starts the data taking and calculation program. Pressing the function key 28 records the current (y) reading [herein (r.rev)]. Next, the head is turned face outward as seen in FIG.

Figure 25:
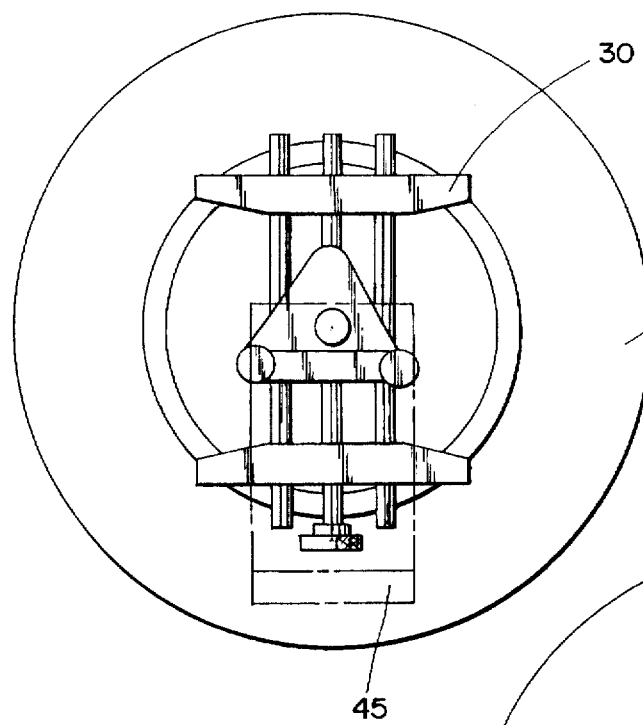
FIG. 25 is a side view of the attachment of the rim adaptor and head to a wheel with the rim adaptor in the 6 o'clock position.
Figure 26:
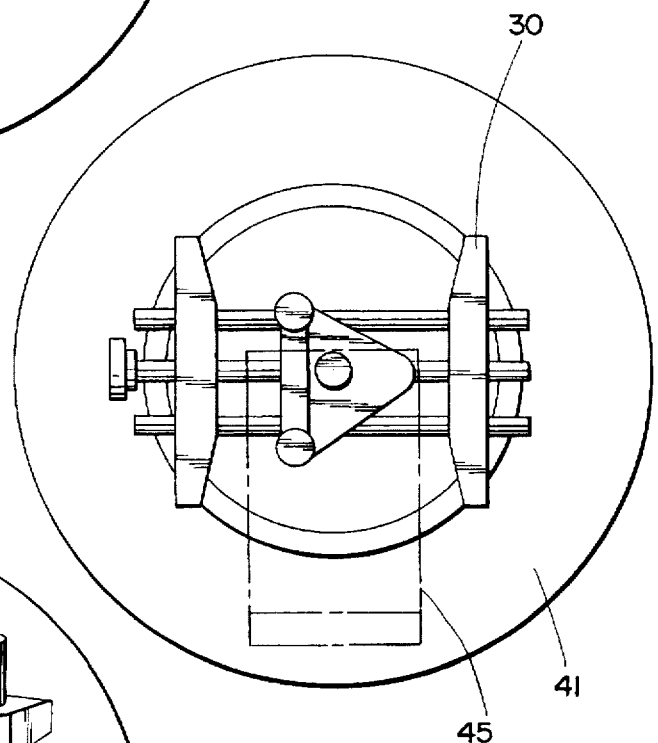
FIG. 26 is a side view of the attachment of the rim adaptor and head to a wheel with the rim adaptor in the 9 o'clock position.
Figure 29:
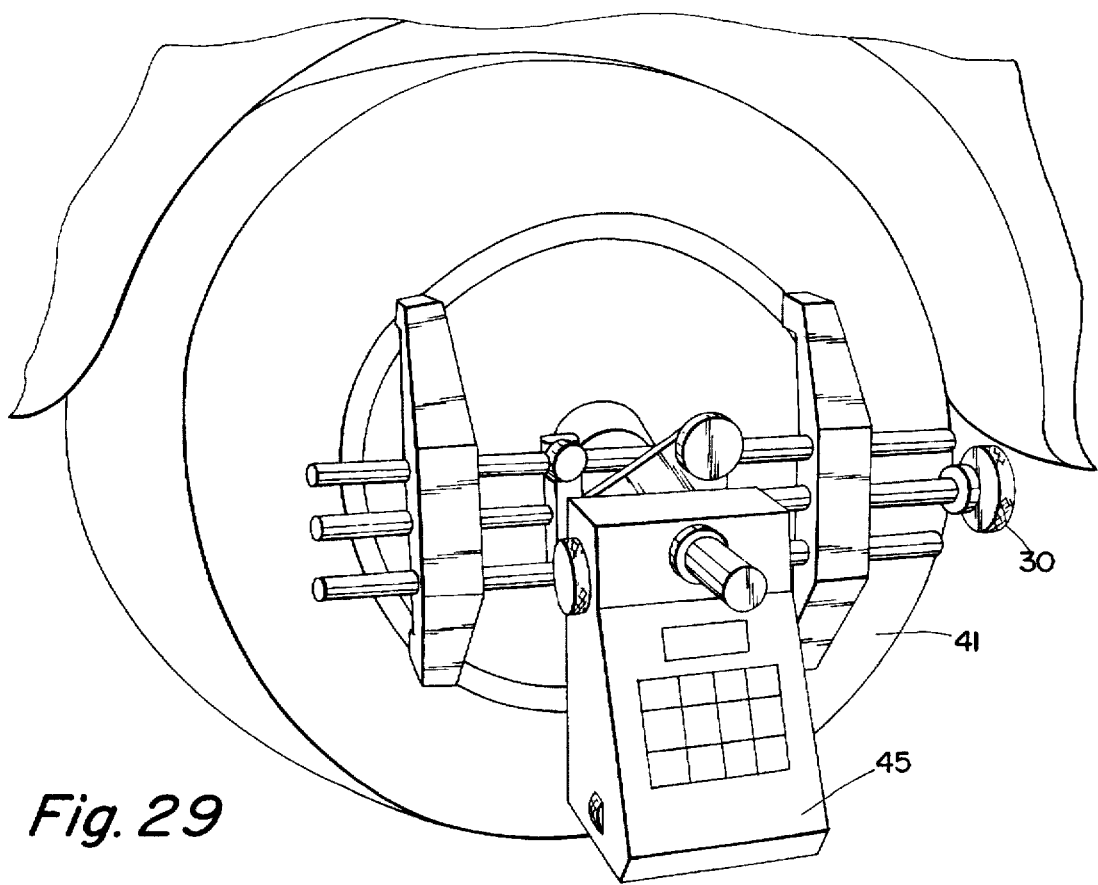
FIG. 29 is a perspective view of the attachment of the rim adaptor and head to a wheel with the rim adaptor in the 3 o'clock position.

28. Pressing the function key 28 will record the current (y) angle reading [herein (r.0)]. Next the wheel 41 with the rim adaptor 30 attached is rotated to the 90 degree or 3 o'clock position as seen in FIG. 29. The rotation may be accomplished by raising the vehicle and rotating the wheel 41 or by rolling the vehicle along a flat surface. The head 45 is allowed to hang freely on the rim adaptor 30. Pressing the function key 28 will record the current (y) angle reading [herein (r.90)]. A like procedure is followed for the rim adaptor 30 in the 180 degree or 6 o'clock position as seen in FIG. 25. The resulting (y) angle measurement is called (r.180). A like procedure is followed for the rim adaptor 30 in the 270 degree or 9 o'clock position as seen in FIG. 26. The resulting (y) angle measurement is called (r.270). The rim adaptor 30 is next rotated to the original, 0 degree position for other measurements. The program makes the following tests and calculations:

1. If (r.0)+(r.180)−(r.90)−(r.270) is greater than 0.05 degrees or less than −0.05 degrees, then (error.y)=0, (error.z)=0 and "FFF" is displayed in the display 38 to indicate failure. This test implies the suspension system of the wheel changed during the test. Hence, the results are invalid.
2. If (r.0)−(r.180) is greater than 0.5 degrees or less than −0.5 degrees or if (r.90)−(r.270) is greater than 0.5 degrees or less than −0.5 degrees, then (error.y)=0, (error.z)=0 and "FFF" is displayed in the display 38 to indicate failure. This test implies the wheel spindle, the wheel rim or the rim adaptor 30 is bent or attached improperly. This is a diagnostic indication of mechanical damage which should be corrected. Hence, the results are invalid.
3. If the above tests are passed, then $$(error.y)=0.5\times[(r.0)-(r.180)] \quad \text{(eqn. 1)}$$

$$(error.z)=0.5\times[(r.90)-(r.270)] \quad \text{(eqn. 2)}$$

$$(error.sensor)=0.5\times[(r.0)+(r.rev)] \quad \text{(eqn. 3)}$$

A variation of the RUNOUT process is for applications in which the error caused by the electronic drift and the angle sensor is tolerable, the (r.rev) process need not be done. In this case, (error.sensor)=0.

Another variation of the RUNOUT process is for applications in which the wheel will not move vertically during the RUNOUT process, the measuring of (r.0) need not be done. In this case, (r.0)=(r.90)+(r.270)−(r.180) is substituted in eqn. 1 and eqn. 3.

Another variation of the RUNOUT process is for applications in which only the (error.sensor) need be measured. Only (r.rev) and (r.0) need be measured. The wheel need not be rotated, (error.y) and (error.z) will not be changed. Since (error.sensor) changes with time and is a result of electronic and angle sensor drift, performing this immediately preceding a camber or tilt measurement will provide greater accuracy.

Calculating Camber

The camber measurement is called "(camber)". The operator attaches the head 45 to the wheel 41 of a vehicle as seen in FIG. 28, allows the head 45 to rotate freely and presses the camber key 23. The circuit board 15 measures the (y) electronic signal from the angle sensor 29, calculates (camber) and displays the number in the display 38. (camber) is calculated as follows:

$$(camber)=(y)-(error.y)-(error.sensor) \quad \text{(eqn. 4)}$$

Calculating Tilt

The tilt measurement is called "(tilt)". The operator presses the tilt key 24, the circuit board 15 senses the (x) electronic signal from the angle sensor 29, calculates (tilt) and displays the number in the display 38. (ht) is +1 if the laser beam exits the head 45 on the right side. (ht) is −1 if the laser beam exits the head 44 on the left side. (ht) is programmed in each head 44 and 45 during manufacture. (tilt) is calculated as follows:

$$(tilt)=(ht)\times[(x)-(error.sensor)] \quad \text{(eqn. 5)}$$

Setup for Measuring Toe Relative to the Chassis

Figure 1:
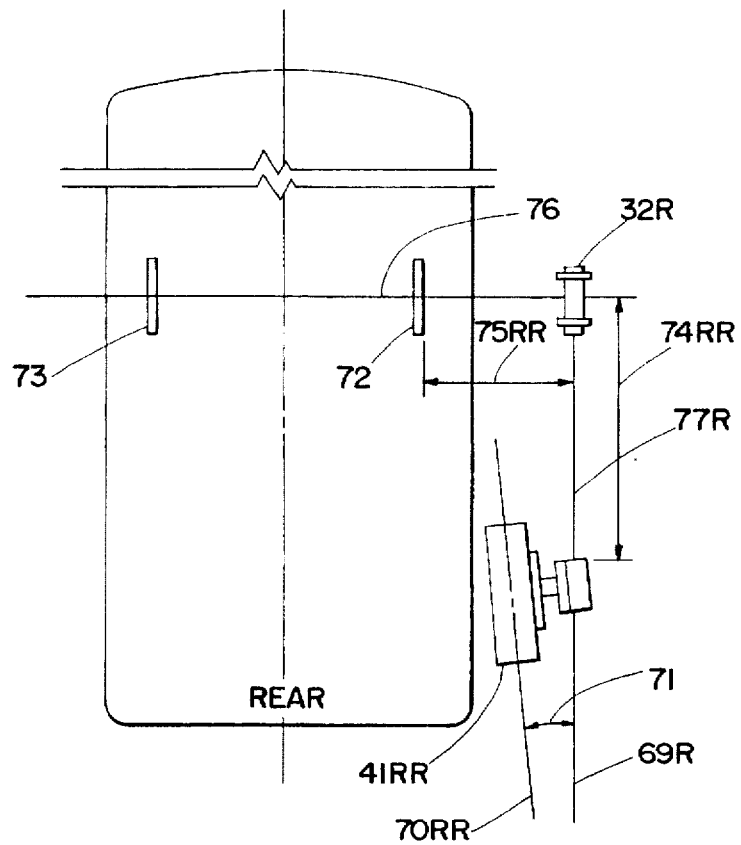
FIG. 1 is a top schematic view of the right rear wheel layout of a vehicle for a chassis toe alignment according to the present invention.

FIG. 1 is a schematic diagram for the definition of the chassis alignment toe angle, chassis setback and chassis offset of the right rear wheel. A unique aspect of this invention is to be able to measure the specific alignment and chassis parameters relating the wheel to the chassis using identifiable chassis structures.

Reference points 72 and 73 are chosen to be on a line which is lateral to the vehicle and which is identified as a reference line. The right reference point 72 and left reference point 73 are real, physical objects or holes on the vehicle. Therefore, they are easy to identify. Prior art refers to a "centerline" which is not a physical object on the vehicle and, hence, is difficult to identify. The manufacturer's specification will usually label a reference line on which the reference points lie as the "O" line. These points are usually torque box holes but can be spring attachment fixtures or other fixtures or holes. These points are lateral to the axis of the vehicle. The reference line on which the right reference point 72 and left reference point 73 lie are, by design, perpendicular to the centerline and equidistant from the centerline.

A magnetic gauge assembly 89R is placed at a right reference point 72 close to the right rear wheel 41RR for which the toe is to be measured. Another magnetic gauge assembly 89L is placed at a left reference point 73.

The operator attaches the head 45 to the wheel of a vehicle as seen in FIG. 28, tightens the break knob 2 such that the head 45 is held level and is physically against the rim adaptor 30. Next, the operator presses the toe key 22. The circuit board 15 senses the (z) electronic signal from the potentiometer 13. The prism assembly 32R is placed such that the light beam from the head 77R (see FIG. 1) strikes the prism assembly 32R in the end hole 58 and is reflected by the prism 55 out the side hole 59. By moving the prism assembly 32 and by rotating the tube 54 of the prism assembly 32 and by rotation of the toe adjustment knob 3, the light beam from the head 45RR and the prism assembly 32R are adjusted such that the light beam passes through the transparent gauges 33R and 33L at reference points 72 and 73.

The right wheel chassis toe angle 71 is defined as the angle between the direction of the right rear wheel 41RR and the direction of the light beam 69RR and is the number (toe.RR.ch). The right rear wheel chassis setback 74RR is defined as the distance from the deflected light beam through the reference points 76 to the center of the right rear wheel 41RR along the optical path of the longitudinal light beam from the head 77R and is the number (setback.RR.ch). The right rear wheel chassis offset 75RR is defined as the distance from the longitudinal light beam from the head 77R to the right reference point 72 along the optical path of the deflected light beam through the reference points 76 and is the number (offset.RR.ch).

A similar procedure can be employed to measure the toe of the left rear wheel 41LR designated as the number (toe.LR.ch), setback of the left rear wheel designated by the number (setback.LR.ch) and offset of the left rear wheel designated by the number (offset.LR.ch)

A similar procedure can be employed to measure the toe, setback and offset of the front wheels 41RF and 41LF. However, this should be done only when the centerline is straight.

Calculating Toe Relative to the Chassis

The number that appears in the display 38 when the toe key 22 is pressed is called "(toe)". When the operator presses the toe key 22, the circuit board 15 senses the (z) electronic signal from the potentiometer 13, calculates (toe) and displays the number in the display 38. To calculate (toe) with the correct sign, one other number is required, (r1). (r1) is +1 if the right key led 95 is on. (r1) is −1 if the left key led 96 is on. The operator can change which led 95 or 96 is on by pressing the right/left key 25. If the head 45 or 44 is on a right wheel 41RR or 41RF, the right key led 95 should be on. If the head 45 or 44 is on a left wheel 41LR or 41LF, the left key led 96 should be on. (toe.nc) is a number that is (toe) when (x)=0 and (y)=0. (toe.nc) is calculated as follows:

$$(toe.nc) = (r1) \times [(z) - (error.z)] \qquad \text{(eqn. 6)}$$

The gain correction factor for situations when (x), (y) or both are not 0 is a complex trigonometric function. Trigonometric functions can be expressed as a power series of the angle. Therefore, the gain correction factor can also be approximated as a power series of the angles. (k1), (k2), (k3), (k4), (k5), (k6), (k7) and (k8) are constants stored in the circuit board 15 program. Each of these constants is equal to or greater than 1, is dependant of the geometry of the particular implementation and is determined empirically. Therefore, (toe) is calculated as:

$$(toe) = (toe.nc) \times [(k1) + \{(x)/(k2)\} + \{(x)/(k3)\}^2 + \{(x)/(k4)\}^3 + \ldots$$
$$] \times [(k5) + \{(y)/(k6)\} + \{(y)/(k7)\}^2 + \{(y)/(k8)\}^3 + \ldots] \qquad \text{(eqn. 7)}$$

Note: The term "{ }^n" means raise the number in the braces to the nth power. For instance, {2}^3=2×2×2=8.

In the preferred practice of use of this invention, the (x) angle is made less than 0.5 degrees, then (k1)=1 and all other (x) terms are very small relative the required accuracy. Also, the RUNOUT process assured the (error.y) was less than 1 degree. Camber on road vehicles is usually designed to be less than 3 degrees, and often less than 1 degree. Race cars may have more camber. In these circumstances, (toe) of eqn. 7 can be simplified as:

$$(toe) = (toe.nc) \times [1 - \{(y)/81\}^2] \qquad \text{(eqn. 8)}$$

If the head 45 is on the right rear wheel 41RR and the chassis alignment method is being performed, then the (toe) number appearing in the display 38 is the number (toe.RR.ch). If the head 45 is on the left rear wheel 41LR and the chassis alignment method is being performed, then the (toe) number appearing in the display 38 is the number (toe.LR.ch).

The difference between the numbers (setback.LR.ch) and (setback.RR.ch) is defined as (setback.tot.ch) and calculated:

$$(setback.tot.ch) = (setback.RR.ch) - (setback.LR.ch) \qquad \text{(eqn. 9)}$$

If (setback.tot.ch) is not equal to 0, then the axle is rotated. The difference between the numbers (offset.LR.ch) and (offset.RR.ch) is defined as (offset.tot.ch) and calculated as:

$$(offset.tot.ch) = (offset.LR.ch) - (offset.RR.ch) \qquad \text{(eqn. 10)}$$

If (offset.tot.ch) is not equal to 0, then the axle is offset.

Thrust Angle Toe

The thrust angle of a vehicle [herein the number "(ta)"] is the average of the toe of the right rear wheel 41RR and the toe of the left rear wheel 41LR. The thrust angle is calculated as:

$$(ta) = 0.5 \times [(toe.LR.ch) - (toe.RR.ch)] \qquad \text{(eqn. 11)}$$

Figure 2:
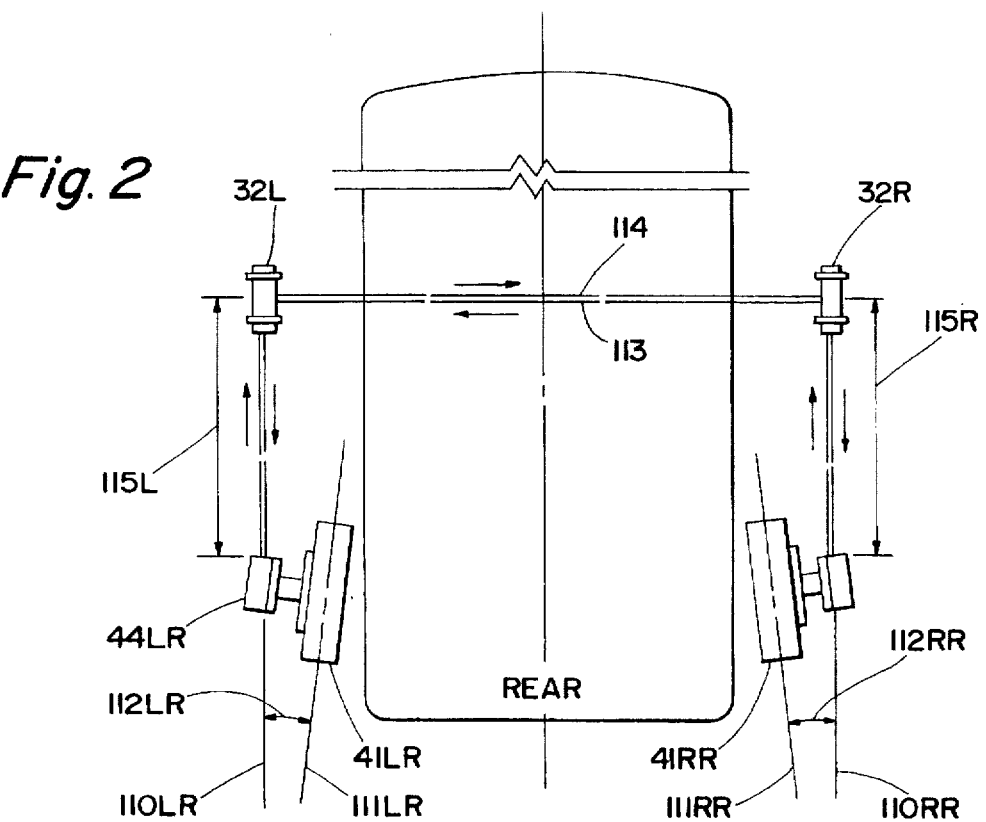
FIG. 2 is a top schematic view of the rear wheel layout of a vehicle for measuring rear wheel toe in a thrust angle alignment.

FIG. 2 is a schematic diagram of a second embodiment of the invention for the measurement of toe of the rear wheels in the thrust angle alignment method and is used to define the thrust angle alignment toe angle and setback of the right rear wheel 41RR and the left rear wheel 41LR. In the thrust angle alignment method, the thrust line toe angle of the right rear wheel 112RR is defined as the angle between the direction of the right rear wheel 111RR and the direction of the thrust angle light beam 110RR. In the thrust angle alignment method, the thrust line toe angle of the left rear wheel 112LR is defined as the angle between the direction of the left rear wheel 111LR and the direction of the thrust angle light beam 110LR. The thrust line setback of the right rear wheel 115R is defined as the distance from the deflected light beam from the right head 113 to the center of the right rear wheel 41RR. The thrust line setback of the left rear wheel 115L is defined as the distance from the deflected light beam from the left head 114 to the center of the left rear wheel 41LR.

The thrust line toe angle of the left rear wheel 112LR is represented by the number (toe.LR.ta) is calculated as:

$$(toe.LR.ta) = (toe.LR.ch) - (ta) \qquad \text{(eqn. 12)}$$

The "direction of the thrust line of the left rear wheel" which is in the direction of the thrust angle light beam 110LR is in a direction at an angle (toe.LR.ta) from the wheel direction of the left rear wheel 111LR and in the horizontal plane passing through the center of the left rear wheel 41LR. When the toe key 22 is pressed and the toe adjustment knob 3 on the left head 44 on the left rear wheel 41LR is rotated until the number appearing in the display 38 is (toe.LR.ta), the light beam from the left head 44 will be in a direction of the thrust line of the left rear wheel 41LR and parallel to the thrust line of the vehicle.

In a similar manner (toe.RR.ta) is calculated as:

$$(toe.RR.ta) = (toe.RR.ch) + (ta) \qquad \text{(eqn. 13)}$$

Similarly, the "direction of the thrust line of the right rear wheel" which is in the direction of the thrust angle light beam 110RR is in a direction at an angle (toe.RR.ta) from the wheel direction of the right rear wheel 111RR and in the horizontal plane passing through the center of the left rear wheel 41RR.

A number called (treadwidth.spec) is usually found in the manufacturer's specification and labeled "treadwidth of the rear wheels". Alternatively, (treadwidth.spec) may be measured as the distance from the center of the right rear wheel 41RR to the center of the left rear wheel 41LR. A number (ta.setback) is calculated as:

$$(ta.setback) = \arctan\left[(setback.tot.ch)/(treadwidth.spec)\right] \qquad \text{(eqn. 14)}$$

If (ta) is not equal to 0, the operator may adjust the toe of each wheel or adjust the rotation of the rear axle. Performing the incorrect adjustment can worsen the performance of the vehicle. The thrust angle can be corrected by (ta.setback) by rotating the rear axle. This unique diagnostic method allows the operator to determine the correct adjustment.

A number called (wheelbase.spec) is usually found in the manufacturer's specification and labeled "wheelbase". Alternatively, (wheelbase.spec) may be measured as the distance from the center of the right front wheel 41RF to the center of the right rear wheel 41RR.

A number defined as the "effective thrust angle" [herein "(eta)"] is calculated as:

$$(eta)=arctan \ |(offset.tot.ch)/(wheelbase.spec)| \qquad \text{(eqn. 15)}$$

A number (toe.RR.eta) is defined and calculated as:

$$(toe.RR.eta)=(toe.RR.ta)+(eta) \qquad \text{(eqn. 16)}$$

The "direction of the effective thrust line of the right rear wheel" is defined as a direction at an angle (toe.RR.eta) from the wheel direction of the right rear wheel 70RR and in the horizontal plane passing through the center of the right rear wheel 41RR. When the toe key 22 is pressed and the toe adjustment knob 3 on the head 45LR on the right rear wheel 41RR is rotated until the number appearing in the display 38 is (toe.RR.eta), the light beam from the head 45LR will be in a direction of the effective thrust line of the right rear head.

A number (toe.LR.eta) is defined and calculated as:

$$(toe.LR.eta)=(toe.LR.ch)-(eta) \qquad \text{(eqn. 17)}$$

In a similar manner, the "direction of the effective thrust line of the left rear wheel" is defined as a direction at an angle (toe.LR.eta) from the wheel direction of the left rear wheel 70RR and in the horizontal plane passing through the center of the left rear wheel 41LR. In a similar manner, the light beam from the left rear wheel head 77L can be directed in a direction of the effective thrust line of the left rear head.

If (eta) is not equal to 0, the operator may adjust the toe of each wheel or adjust the location of the rear axle. Performing the incorrect adjustment can worsen the performance of the vehicle. The thrust angle can be corrected by (eta) by moving the rear axle. This unique diagnostic method allows the operator to determine the correct adjustment.

Alternative Method of Finding the Direction of the Thrust Lien for Each Rear Wheel This method begins with the attachment of the right rear rim adaptor 30RR and the right rear head 45RR to the right rear wheel 41RR. Next the attachment of the left rear rim adaptor 30LR, the left rear head 44LR. When the toe key 22RR of the right rear head 45RR is pressed, the toe adjustment knob 3 of the right rear head 45RR is adjusted such that the number "0.00" appears in the right rear wheel display 38RR. The light beam from the right head 113 is directed out of the head 45RR to the right prism assembly 32R. The right prism assembly 32R is adjusted such that the light from the side hole 59R is directed under the vehicle to the left side of the vehicle and impinges on the left prism holder 31L. The right prism assembly 32R and the left prism assembly 32L are adjusted such that the light beam from the right side of the vehicle is directed into the side hole of the left prism holder 59L, out the end hole of the left prism holder 58L and into the light hole of the left wheel measuring head 44L. Next the light directional adjustment knob of the left wheel head 3L is adjusted such that the light from the left wheel head 44LR is directed to the end hole of the left prism assembly 32L. After pressing the toe key 22L of the left rear head 44LR, the number appearing in the left rear wheel display 38LR is called "(toe.total.ta)".

The thrust line toe angle of the left rear wheel 112LR (see FIG. 2) is now calculated as:

$$(toe.LR.ta)=(toe.total.ta)/2 \qquad \text{(eqn. 18)}$$

The thrust line toe angle of the right rear wheel 112RR (see FIG. 2) is now calculated as:

$$(toe.RR.ta)=(toe.total.ta)/2 \qquad \text{(eqn. 19)}$$

Next the "direction of the thrust line of the left rear wheel" and the "direction of the thrust line of the right rear wheel" are found as described previously.

Front Wheel Toe

The rear wheel toe methods described previously resulted in the light beam from the rear heads 45RR and 44LR being directed in the direction of the light beam 69R and 69L perpendicular to the reference line established by the rear reference points 72 and 73, in the direction of the thrust line toe angles 112RR and 112LR or in the direction of the effective thrust line. The operator chooses which light beam direction to use. The front wheel toe measures the direction of the front wheel 41RF or 41LF relative to the direction of the light beam chosen by the operator.

Figure 3:
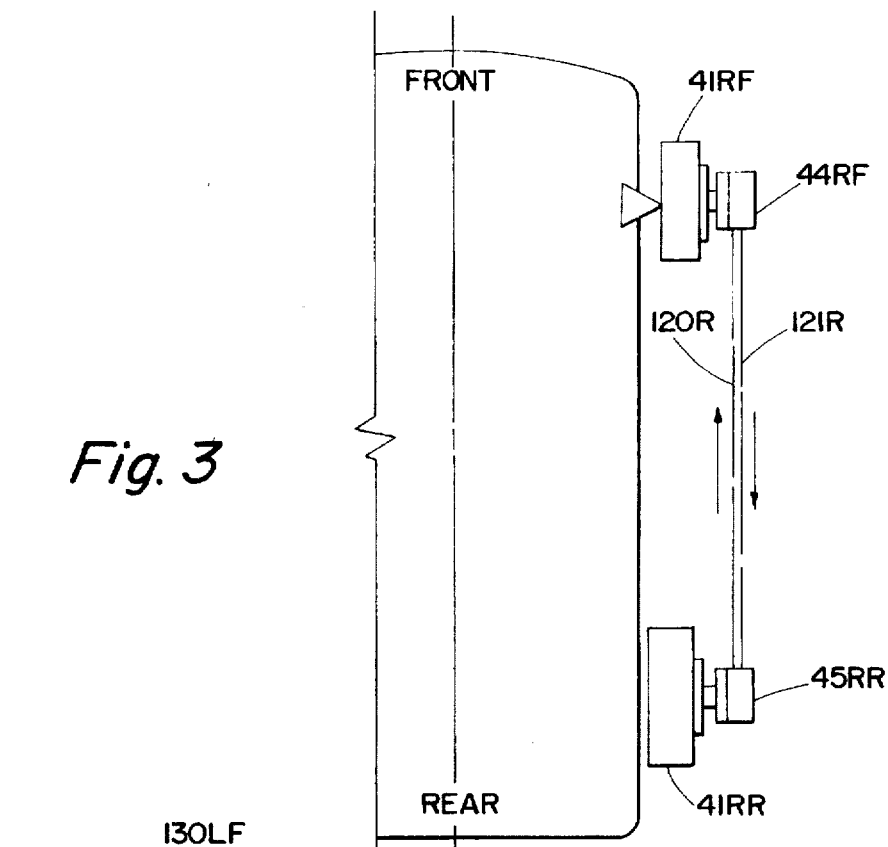
FIG. 3 is a top schematic view of the right side layout of a vehicle for measuring the front, right side wheel toe.

FIG. 3 is a schematic view of the right side layout of a vehicle for measuring the front, right side wheel toe. The operator has chosen the direction of the light beam from rear head 120R.

The heads 45RR and 45RF are moved on their respective rim adapters 30RR and 30RF until the light beam from rear head 120RR from the rear head 45RR strikes the front head 44RF in or slightly above the front light exit hole 7RF. Next the light beam from the front head 121L is adjusted by rotating the light direction adjustment knob 3RF until the light beam from the right front head 121R strikes the right rear head 45RR in or slightly above the right rear light exit hole 7RR.

The number appearing in the right front wheel display 38RF is the toe of the right front wheel relative to the direction of the light beam chosen 90R. If the chassis direction was chosen, the number measured is (toe.RF.ch). If the thrust angle direction was chosen, the number measured is (toe.RF.ta). If the effective thrust angle direction was chosen, the number measured is (toe.RF.eta).

The workers skilled in the art will understand how to accomplish like measurements on the other wheels of the vehicle.

Figure 4:
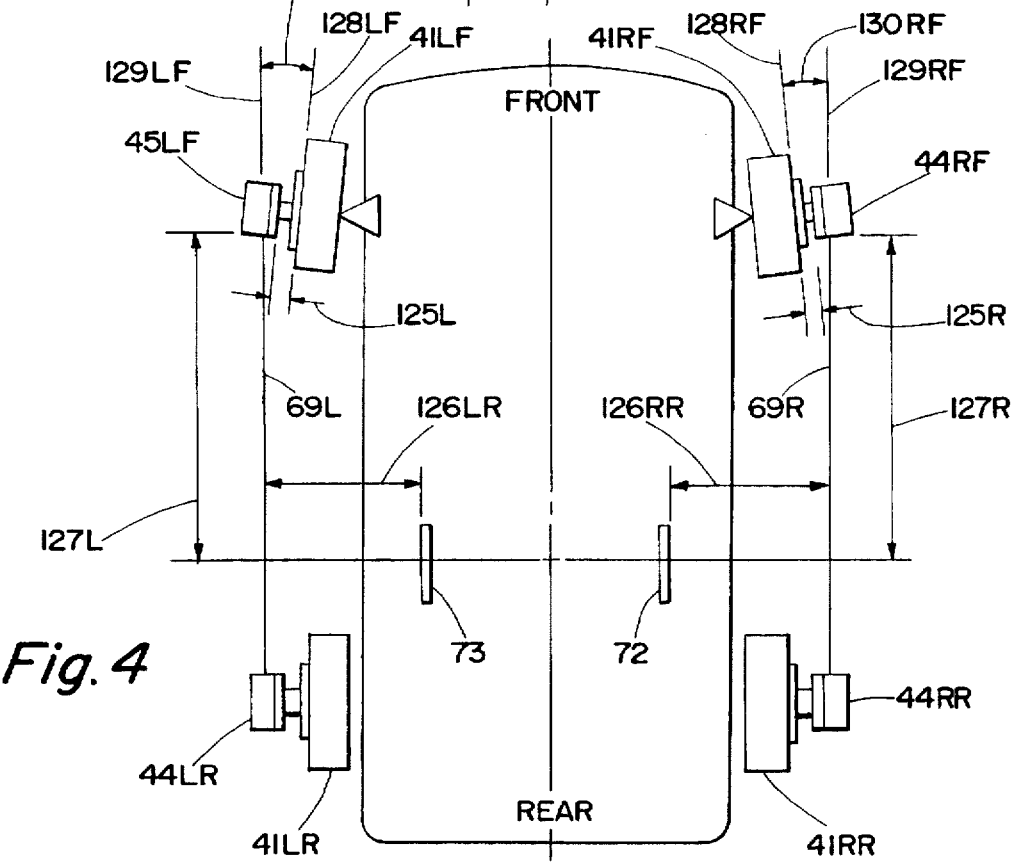
FIG. 4 is a top schematic view of a four wheel vehicle and an outline of the body thereof, together with the major components of the apparatus for measuring front wheel toe, setback and offset according to the type of alignment chosen.
Figure 7:
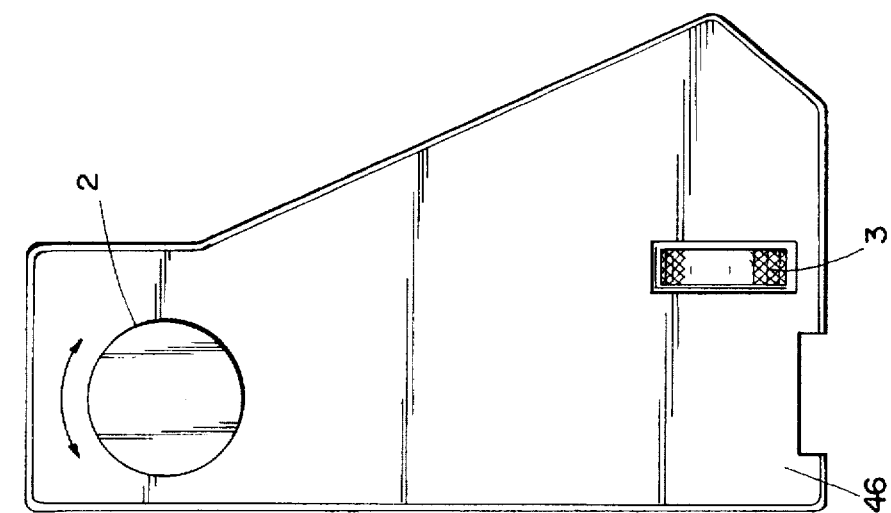
FIG. 7 is the break side view of the measuring head of FIG. 5.
Figure 6:
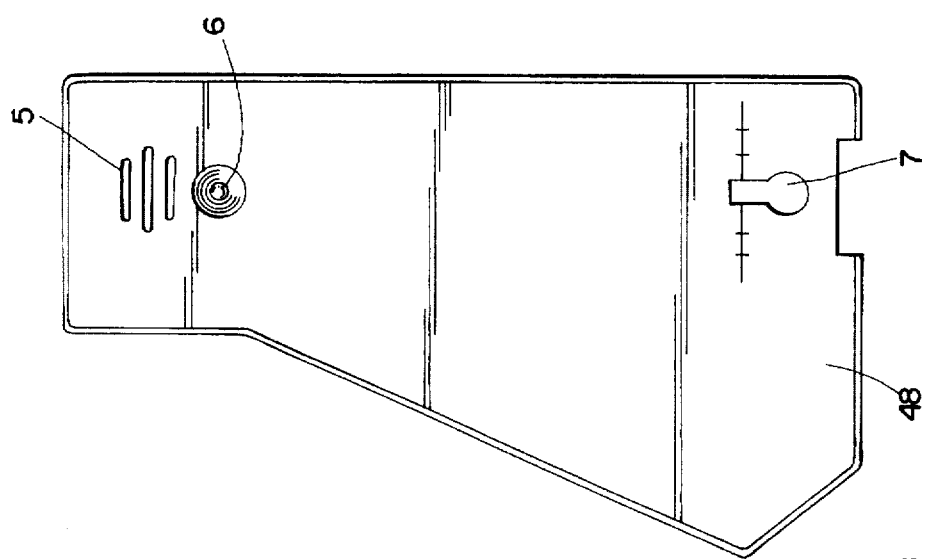
FIG. 6 is the laser side view of the measuring head of FIG. 5.
Figure 5:
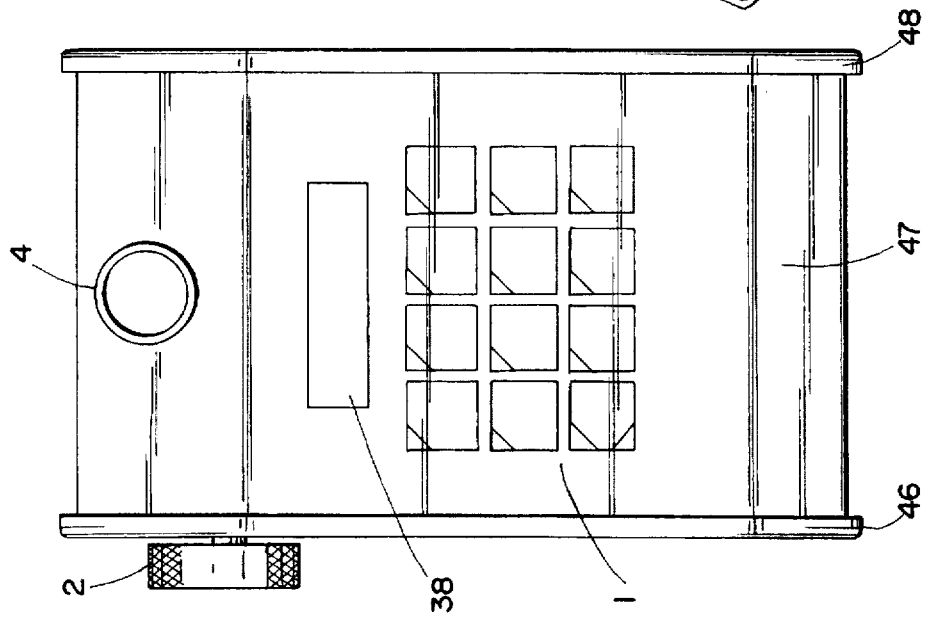
FIG. 5 is front view of the measuring head.

FIG. 4 is a schematic view of a four wheel vehicle and an outline of the body thereof and is used to define the front wheel toe angle, setback and offset of the right front wheel 41RF and the left front wheel 41LF. The toe angle of the front right wheel 130RF is the a angle between the direction of the right front wheel 128RF and the direction of the light beam 129RF. The setback of the right front wheel 127R is the distance from the center of the head 44RF and the reference line established in the chassis alignment method of FIG. 1. The offset of the front right wheel is the reference point to light beam distance 126R between the right reference point 72 and the direction of the light beam 69R as established in the front wheel toe procedure minus the front wheel hub to wheel distance 125R between the right front wheel 41RF and the head on the right front wheel 44RF.

The left front wheel toe angle 130LF, setback of the left front wheel 127LF and offset (reference point to light beam distance 126LF minus front wheel hub to head distance 125R) are defined similarly.

This unique method of measuring setback and offset of the front wheels relative to the same reference points as the rear wheels allows the correct diagnosis of the position of the front wheels even if the centerline is bent. Therefore, the correct adjustments may be made. Performing the incorrect adjustment can worsen the performance of the vehicle.

Diagnostic Methods

The static bounce and jounce method starts by attaching heads to the wheels on opposite sides of the vehicle 44RF and 45LF as has been previously described. The brake knob 2 is tightened on each head 44RF and 45LF so the heads are restricted from rotation. The (camber) and (tilt) numbers are read and recorded from each display 38RF and 38LF. The light beam is turned on by pressing the laser on/off key 21. The point where each light beam strikes a wall or target is noted. Next the front of the vehicle is raised high enough to cause the suspension to drop but not so high to cause the wheels to leave the floor. This is usually from 2 to 4 inches. The (camber) and (tilt) numbers are again read and recorded from each display 38RF and 38LF. The point where each light beam strikes a wall or target is again noted. Next the front of the vehicle is raised pulled down enough to cause the suspension to compress but not so low to cause the suspension to reach a limit of movement. This is usually from 2 to 4 inches. The (camber) and (tilt) numbers are again read and recorded from each display 38RF and 38LF. The point where each light beam strikes a wall or target is again noted. The vehicle is allowed to return to it's normal position.

The dynamic jounce and bounce is done next. The toe key 22RF and 22LR are pressed. Then the camber key 23RF and 23LF are pressed. This resets the electronic counters in the program in the circuit board 15. Next the operator push down and up on the front of the vehicle to cause the vehicle to bounce in a vertical direction in a natural oscillation. The vehicle should move at least 3 inches up and 3 inches down. After ceasing the bouncing of the front of the vehicle, the operator will read and record a series of numbers from the displays 38RF and 38LF. Since the camber key 23RF and 23LF were last pressed, by pressing the function key 28RF and 28LF once the maximum camber experienced during the bounce and jounce on each respective wheel will appear on the display 38RF and 38LF. These numbers are designated (camber.max.RF) and (camber.max.LF). The numbers will appear for 4 seconds. Next, pressing the function key 28RF and 28LF twice will cause the minimum camber experienced during the bounce and jounce on each respective wheel to appear on the display 38RF and 38LF. These numbers are designated (camber.min.RF) and (camber.min.LF). The numbers will appear for 4 seconds.

Next press the tilt key on each head 24RF and 24LF. By pressing the function key 28RF as was done for camber, above, (tilt.max.RF), (tilt.max.LF), (tilt.min.RF) and (tilt.min.LF) are read and recorded. The numbers will appear for 4 seconds.

The same may be done for the rear wheels of the vehicle 41RR and 41LR.

The analysis of these measurements involves comparing side to side like numbers. The minimum or maximum numbers with the greatest deviation from the relaxed state numbers and a deviation of greater than 2 degrees from the relaxed state numbers will be the side with damaged components. If the static numbers indicate a problem, the length or position of the respective control arm is suspect. If the dynamic numbers indicate a problem, a situation that allows a change is present such as loose ball joints or the frame holding the ball joints is cracked.

The movement of the light beam during the vehicle's vertical movement can be used to diagnose the condition of the steering linkage. The unique feature of this invention is that the vertical movement of the vehicle and the horizontal movement of the toe angle change are related on a graphical plot of the track of the light beam. Therefore, not only can the traditional bump steer problems be detected, but other adjustment problems such as length of steering arms can be seen.

Another diagnostic tool is the measurement of the frequency of the bouncing of a vehicle. The method of measuring the frequency of the bouncing of a vehicle begins with the heads 44RF and 45LF attached as was done for the dynamic bounce and jounce described above. First, the toe keys 22RF and 22LF are pressed. Then the camber key 23RF and 23LF are pressed. This sets the electronics to measure the frequency of the change in the signal from the angle sensor 29. The number "0" will appear in the display 38RF and 38LF. Next the operator push down and up on the front of the vehicle to cause the vehicle to bounce in a vertical direction in a natural oscillation. This bouncing should continue until the display changes to a number other than "0". This number will be the frequency of oscillation of the wheel being tested (freq.RF). Similar procedure may be used to develop the frequency of the other wheels of the vehicle.

Workers skilled in the art will recognize that the frequency of oscillation of a spring system is a characterizing number for such system. As such, comparing the frequency numbers for each wheel will provide insight into the behavior of the vehicle over bumps, during acceleration, during breaking and in turns. If the frequency of oscillation of the right front is significantly different from the left front, if the rear is not slightly higher in frequency than the front or if the frequency of oscillation of the right rear is significantly different from the left rear, then erratic behavior of the vehicle over bumps, during acceleration, during breaking and in turns can be expected.

Another diagnostic tool is the measurement of the frequency of the sound detected during bouncing of a vehicle. The method of measuring the frequency of the sound of the bouncing of a vehicle begins with the heads 45RF and 45LF attached as was done for the dynamic bounce and jounce described above. First, the toe key 22RF and 22LR are pressed. Then the camber keys 23RF and 23LF are pressed. This sets the electronics to measure the frequency and amplitude of the signal from the sonic sensor 9. The number "00" will appear in the display 38RF and 38LF. Next the operator push down and up on the front of the vehicle to cause the vehicle to bounce in a vertical direction in a natural oscillation. This bouncing should continue until the display changes to a number other than "00". This number will be the frequency of oscillation of the loudest sound generated by the vehicle near the wheel being tested (freq.RF). Similar procedure may be used to develop the frequency of the loudest sound for the other wheels of the vehicle.

Workers skilled in the art will recognize that the frequency of oscillation of a sound in a mechanical system is a characterizing number the presence of various conditions present in the system.

The numbers calculated by the circuit board 15 during the bounce and jounce may also be transmitted to the data connector 11. The data then can be analyzed in greater detail by a computer. The unique feature of this invention is to use computer data analysis to analyze frequency of bouncing and of the sound generated during movement to detect structural problems in vehicles.

Measuring Procedures

The fan of light 42 produced by the fan generator 62 can be used to produce a horizontal datum plane, a vertical datum plane under the vehicle, a vertical datum plane beside the vehicle, and a line of light on the vehicle to show the position of a line such as where the centerline should be. Distance to any point on the vehicle can then be accurately measured.

FIG. 24 shows the fan generator 62 in a head 45 or 44. The head 45 or 44 is placed on a tripod by using the tripod attachment hole 35 or other support. The magnetic gauges are placed in appropriate positions as has been previously described. The fan of light is then made to impinge on the transparent gauge 33 at a constant distance down from the vehicle. Two other points are chosen and the fan of light is made to impinge on 3 points on the vehicle equalliy distant down. These points should not be collinear. This forms a fan of light in a horizontal datum plane horizontal to the vehicle even if the vehicle is not horizontal to gravity.

Distances from the horizontal fan of light to a vehicle point is measured with a ruler extending from the said point through the fan of light. When the fan of light impinges on the ruler, a line of light can be seen on the ruler. The ruler is moved so as to find the minimum distance between the said point and the line of light. This assures the perpendicular distance is measured.

By rotating the fan generator 62 in the light exit hole 7, the fan of light 42 can be made to impinge on 3 points on the vehicle. These points should not be collinear. If these points are on the centerline of the vehicle, the line of light on the vehicle will be a visual marking of the centerline of the vehicle. By using a ruler in a like manner as was used in the horizontal datum plane measuring above, distances from points to the vertical datum plane can be measured.

In like manner, a vertical datum plane can be established at the side of the vehicle or on top of the vehicle.

The unique aspect of the use of the magnetic gauge assemble 89 and the fan generator 62 with a head 44 or 45 is that it represents another use of the apparatuses of this invention and can mark the horizontal or vertical datum planes without the vehicle being on a level surface and distances can be measured.

While the above is a complete description of the preferred embodiments, workers skilled in the art will recognize that changes may be made in form and detail without departing from the spirit and scope on the invention. For example, it is within the scope of this disclosure to use any suitable form of light. It is also within the scope of this invention to provide support means for holding the prism and means for locating the position of vehicle body parts. It is also within the scope of this invention to provide a means of directing the light in a known direction such as 30 degrees or 60 degrees. It is also within the scope of this invention to use another means of light projection. Even though this embodiment uses a potentiometer as a means of measuring the angle of the light projection, other means using capacitors or inductors could be used. It is also within the scope of this invention to use automatic rather than manual means to take data and calculate the position of the magnetic gauges and to use gauges which sense when light is impinging on them. It is also within the scope of this invention to use other types of electronic analysis of the frequency of the movement or the frequency of sounds generated during movement to identify operating characteristics of a vehicle.

What is claimed is:

1. An apparatus for wheel alignment of a vehicle having a chassis, said apparatus comprising:

a first gauge element adapted in use to be mounted to a first reference point on the chassis of the vehicle;

a second gauge element adapted in use to be mounted to a second reference point on the chassis of the vehicle; and means, adapted in use to be mounted to a wheel of the vehicle, for generating a first light beam, for directing said first light beam through said first and second gauge elements, and for indicating an angle of the first light beam relative to said wheel.

2. The apparatus as described in claim 1, wherein said first light beam comprises a single, highly collimated beam of light such as to provide a straight line.

3. The apparatus as described in claim 2, further comprising:

a prism, said prism capable of reflecting said first light beam up to 90 degrees, whereby providing a square reference.

4. The apparatus as described in claim 3, further comprising:

a fan generator for providing a plane of light which can be made horizontal or vertical relative to a vehicle.

5. The apparatus as described in claim 1, further comprising:

a head suitable for mounting on the wheel of a vehicle, said head housing said means for directing said first light beam.

6. The apparatus as described in claim 7, further comprising:

display means for displaying data and the results of measurements and calculations of at least one of the wheels on a vehicle.

7. An apparatus for wheel alignment, suspension diagnosis and chassis measurement of vehicles, said apparatus capable of measuring toe relative to the chassis, to the thrust line and to the effective thrust line, said apparatus comprising:

light beam generation means for generating a light beam for indicating an angle, and particularly for measuring the location of vehicle body parts relative to reference lines of the vehicle's manufacturer;

light beam direction means for directing said light beam outwardly in a measurable and adjustable direction;

an electronic angle sensor for measuring said angle;

a microprocessor for controlling said angle sensor and for converting electronic signals from said sensors into calculated diagnostic parameters;

a head for measuring, calculating and controlling data on at least one of the wheels on a vehicle, said head suitable for mounting on the wheel of a vehicle, said head housing said angle sensors, said microprocessor and said light beam generation means;

said apparatus further capable of measuring and calculating toe relative to the chassis, toe relative to other wheels, camber, caster, steering axis inclination, included angle, frequency of jounce and rebound, camber maximum, camber minimum, tilt maximum, and tilt minimum, setback and offset distance measurements, and frequency and amplitude of sonic vibrations, further comprising within said head:

an electronic gravity sensor unit, said gravity sensor unit fixedly attached to said head and including an electronic element which senses said head's orientation relative to gravity in two directions, said unit further comprising the electronic circuit necessary to provide signals to said microprocessor for indicating orientation;

a power unit, said power unit including electrical components necessary to convert incoming voltage into the electrical power needed by the other electrical units and to charge batteries;

a battery unit, said battery unit included within said power unit for providing power to said head such that said head can be utilized in a portable manner;

a display unit for displaying data output from said microprocessor;

a keypad, said keypad being capable of providing to said microprocessor data concerning the operator choices and wheel locations;

a sonic sensor unit for receiving frequency and amplitude of sonic vibrations and for transmitting electrical signals to said signal processing unit described below, said sonic sensor affixed within the part of said head which is directly connected to said shaft of said rim adaptor such as the form a metal connection to the vehicle;

a signal processor unit, said signal processor unit capable of determining the frequencies and amplitude of the sonic vibrations detected by said sonic sensor unit when the vehicle is moved such as to be capable of detecting and determine some types of damage to the vehicle; and an acceleration sensor, said acceleration sensor included within said head, said acceleration sensor further being capable of providing to said microprocessor data concerning the position, velocity and acceleration at each wheel such that while the vehicle is moving a determination can be made as to the relevant motion of said wheel.

8. The apparatus as described in claim 7, further comprising:

first external communication means for communicating with an external computer or remote display module; and second external communication means for communication between a remote sensor module and a microprocessor calculating and control unit.

9. The apparatus as described in claim 5, further comprising:

a rim adaptor for affixing said head in a secured fashion to a vehicle's wheel.

10. The apparatus as described in claim 9, wherein said rim adaptor includes a shaft to affix said rim adapter to said head by an attachment means for enabling said head to be moved toward or away from the wheel, pivoted about said shaft of said rim adaptor, or maintained in a selectable angular position.

11. The apparatus as described in claim 10, wherein said head further includes a light beam projector holding fixture attached to a position monitoring element such that as said light beam is moved, the position monitoring element provides an electronic analog of the orientation of said light beam.

12. The apparatus of claim 7, further comprising:
a battery for powering said microprocessor; and
a charger unit for recharging said battery.

13. The apparatus of claim 1, further comprising:
a supporting means for supporting said head in a manner externally remote from the vehicle and not attached to the vehicle.

14. The apparatus of claim 34, wherein:
said means for directing said first light beam is further capable of projecting said first light beam in a controlled and measurable direction relative to the chassis of a vehicle such that said first light beam may be used as a reference from which distances to body parts of the vehicle can be measured.

15. The apparatus of claim 14, further comprising:
means to rotate said reflected light beam from the head about the axis of the incident beam such that the reflected light beam sweeps a plane at the fixed angle to the incident light beam.

16. The apparatus of claim 14, further comprising:
means to locate chassis parts of the vehicle even in such circumstances that said first light beam remains unable to impinge directly upon said chassis parts of the vehicle.

17. The apparatus described in claim 7, further comprising:
a target assembly; and
means for attaching said target assembly to the vehicle chassis.

18. The apparatus as described in claim 17, wherein said means for attaching said target assemble to the vehicle includes a magnetic gauge assembly.

19. A method for measuring toe relative to a latitudinal reference line for the front and rear wheels of a vehicle, said method utilizing the apparatus as described in claim 6, said method comprising the steps:

(a) directing a light beam perpendicular to a latitudinal reference line of a chassis and, therefore, longitudinally of the vehicle; and (b) calculating the toe.

20. The method for measuring toe relative to the thrust line of a vehicle, said method utilizing an apparatus such as described in claim 6 and comprising the steps:

(a) setting the toe reading on one side of the vehicle to 0, (b) directing the beam through a prism, under the vehicle through the prism on the other side of the vehicle to the head on the other side of the vehicle, (c) directing the beam from the head on the other side of the vehicle such that said beam is also directed through the prisms to the first head, and (d) dividing the reading on the display by 2, this number is the toe angle of the wheels to the thrust line of the vehicle.

21. The method of claim 20, further comprising the steps:

(e) calculating the thrust angle; and (f) directing the light beam in a direction parallel to the thrust line.

22. A method for measuring the distance of identified points of the vehicle from a head as described in claim 7 by use of a prism rotatably retained within a prism assembly and of targets attached to a frame of a vehicle, said method comprising the steps:

(a) assuring a light beam from the head is in the direction along which the measurement is to be taken;

(b) placing the prism assembly in the path of the light beam;

(c) moving the prism assembly along the path of the light beam and rotating the prism in the prism assembly until the reflected light beam strikes the identified point; and (d) measuring the distance along the light beam.

23. A method for measuring the distance of identified points of the vehicle from a head as described in claim 7 by use of a ruler and of targets attached to a frame of a vehicle, said method comprising the steps:

(a) assuring a light beam from the head is in the direction along which the measurement is to be taken;

(b) measuring the distance between the point to be measured and the light beam.

24. A method of measuring the error in camber and toe measurements caused by a damaged wheel rim, imperfect attachment of the rim adaptor or minor changes in the electronic circuit parameters, said method utilizing an apparatus as described in claim 7 and comprising the steps:

(a) measuring the inclination of the head from vertical when the head is facing the wheel;

(b) measuring the inclination of the head from vertical when the head is facing away from the wheel;

(b) rotating the wheel and measuring the inclination of the head from vertical when the head is facing away from the wheel in each of four positions; and (c) calculating the correction factors.

25. The method of claim 24, further comprising the step of calculating the change in camber during the measurement which may be caused by a settling of the suspension.

26. A method of calculating a correction factor in toe measurement of a vehicle caused by the presence of camber of the wheel or tilt of a head, said method utilizing an apparatus as described in claim 7 comprising the steps:

(a) measuring the angle from vertical of the head;

(b) measuring the angle from horizontal of rotation of the head about the mounting shaft;

(c) calculating the change of toe due to the orientation of the head.

27. A method for measuring the toe of the front wheels of a vehicle, said method comprising the steps:

(a) projecting a first light beam in an established direction from a rear wheel of the vehicle;

(b) projecting a second light beam in an established direction from a front wheel of the vehicle; and (c) aligning the second light beam from the front wheel parallel to the first light beam from the rear wheel.

28. A method for determining if the static movement of the suspension and steering systems of a vehicle is improper, said method utilizing an apparatus as described in claim 7, said method comprising the steps:

(a) establishing a light beam direction from the rear wheels to impinge upon a fixed surface;

(b) establishing a light beam direction from the front wheels to impinge upon a fixed surface;

(c) raising the vehicle;

(d) measuring the camber and tilt and noting the movement of the light beams in both the change of toe and change of tilt directions; and (e) lowering the vehicle;

(f) measuring the camber and tilt and noting the movement of the light beams in both the change of toe and change of tilt directions; and (g) comparing the side to side measurements.

29. A method for determining if the dynamic movement of the suspension and steering systems of a vehicle is improper, said method utilizing an apparatus as described in claim 7 and comprising:

(a) establishing a light beam direction from the rear wheels to impinge upon a fixed surface;

(b) establishing a light beam direction from the front wheels to impinge upon a fixed surface;

(c) dynamic bouncing the vehicle;

(d) measuring the maximum and minimum camber and tilt experienced during the bounce, measuring the frequency of the bounce, analyzing the frequency spectrum of the bounce, analyzing the dampening of the frequency of the bounce, measurement of the sounds made by the vehicle, analyzing the spectrum of the sounds made by the vehicle and watching the light beams in both the change of toe and change of tilt directions; and (e) comparing the side to side measurements.

30. A method for determining the appropriate numbers to be used with data from sensors in calculations such that a single head may be used in several wheel locations, said method utilizing an apparatus as described in claim 7, said method comprising the steps:

(a) identifying the wheel location; and (b) recalling the appropriate numbers associated with the wheel location to be used in calculation.

31. A method for measuring toe relative to the effective thrust line of a vehicle, said method utilizing an apparatus such as described in claim 7 and comprising the steps:

(a) measuring the offset and wheelbase of the rear wheels;

(b) calculating the effective thrust angle; and (c) directing the light beam in a direction such that the effective thrust angle is displayed as toe.

32. The apparatus as described in claim 1, further comprising:

means, adapted in use to be mounted to another wheel of the vehicle, for receiving said first light beam, and for directing a second light beam back to said means for generating; and means for adjusting the position of the means for receiving said first light beam with respect to said another wheel so that said first light beam can be received by the means for receiving the first light beam.

33. Method of determining a first alignment parameter of a first body part of a vehicle, the vehicle having a chassis, the chassis having a front end and a rear end, a first reference point on the chassis, a second reference point on the chassis, the first and second reference points establishing a first lateral reference line, the method characterized by:

mounting a first head to a first body part of the vehicle;

generating a first beam of light from the first head;

directing the first beam of light along the lateral reference line; and determining the first alignment parameter of the first body part as a function of a distance and/or an angle of the first beam of light to the first body part.

34. Method, according to claim 33, characterized in that: the first body part is a wheel.

35. Method, according to claim 34, characterized in that: the first alignment parameter is selected from the group consisting of toe, setback, and offset.

36. Method, according to claim 33, characterized by:

moving the head with respect to the first body part; and directing the first beam of light perpendicular to the first lateral reference line.

37. Method, according to claim 33, characterized by:

disposing a first target at the first reference point;

disposing a second target at the second reference point; and directing the first beam of light through the first and second targets.

38. Method, according to claim 33, characterized by:

mounting a second head to a second body part of the vehicle;

receiving, at the second head, the first beam of light from the first head;

directing a second beam of light from the second head to the first head;

determining a second alignment parameter of the second body part as a function of a distance and/or an angle of the second beam of light to the second body part.

39. Method, according to claim 38, characterized by:

moving the second head with respect to the second body part so that the first beam of light strikes the second head.

40. Method, according to claim 39, characterized in that:

the second body part is a wheel.

41. Method, according to claim 40, characterized in that:

the second alignment parameter is selected from the group consisting of toe, setback, and offset.

42. Method, according to claim 38, characterized by:

directing the second beam of light perpendicular to first lateral reference line.

43. Method, according to claim 42, characterized by:

directing the second beam of light through the first and second targets.

\* \* \* \* \*